(12) United States Patent
Lyu

(10) Patent No.: US 10,345,506 B1
(45) Date of Patent: Jul. 9, 2019

(54) LIGHT PROJECTING METHOD AND DEVICE

(71) Applicant: SHENZHEN GUANGJIAN TECHNOLOGY CO., LTD., Shanghai (CN)

(72) Inventor: Fanglu Lyu, Santa Clara, CA (US)

(73) Assignee: Shenzhen Guangjian Technology Co., Ltd., Shanghai (CN)

( * ) Notice: Subject to any disclaimer, the term of this patent is extended or adjusted under 35 U.S.C. 154(b) by 0 days.

(21) Appl. No.: 16/036,801

(22) Filed: Jul. 16, 2018

(51) Int. Cl.
*G02B 6/00* (2006.01)
*F21V 8/00* (2006.01)
*G01C 3/02* (2006.01)

(52) U.S. Cl.
CPC ............. *G02B 6/0036* (2013.01); *G01C 3/02* (2013.01); *G02B 6/005* (2013.01); *G02B 6/0016* (2013.01); *G02B 6/0025* (2013.01)

(58) Field of Classification Search
USPC ............................................ 356/4.01; 385/42
See application file for complete search history.

(56) References Cited

U.S. PATENT DOCUMENTS

| | | | |
|---|---|---|---|
| 4,329,876 A * | 5/1982 | Chen ..................... | G01N 29/221 367/103 |
| 5,138,687 A * | 8/1992 | Horie .................. | G02B 6/12002 385/129 |
| 5,511,142 A * | 4/1996 | Hone ................. | G02B 6/12002 385/129 |
| 8,384,997 B2 | 2/2013 | Shpunt et al. | |
| 8,749,796 B2 * | 6/2014 | Pesach .................... | G01B 11/25 356/610 |
| 9,036,158 B2 | 5/2015 | Pesach | |
| 9,459,461 B2 | 10/2016 | Santori et al. | |
| 2002/0028045 A1* | 3/2002 | Yoshimura ............... | G02B 6/10 385/50 |
| 2002/0097962 A1* | 7/2002 | Yoshimura ............... | G02B 6/10 385/50 |
| 2005/0201657 A1* | 9/2005 | Tiefenthaler ......... | G01N 21/552 385/12 |
| 2008/0297809 A1* | 12/2008 | Holzapfel .............. | G01D 5/266 356/614 |

(Continued)

OTHER PUBLICATIONS

Fanglu Lu et al., "Planar high-numerical-aperture low-loss focusing reflectors and lenses using subwavelength high contrast gratings", Optics Express, vol. 18, No. 12, Jun. 7, 2010, pp. 12606-12614.

(Continued)

*Primary Examiner* — James R Hulka
(74) *Attorney, Agent, or Firm* — Sheppard Mullin Richter & Hampton LLP

(57) ABSTRACT

A waveguide comprises a first surface and a second surface. At least one of the first surface or the second surface comprises a plurality of grating structures. The waveguide is configured to guide an in-coupled light beam to undergo total internal reflection between the first surface and the second surface. The grating structures are configured to disrupt the total internal reflection to cause at least a portion of the in-coupled light beam to couple out of the waveguide from the first surface, the portion of the in-coupled light beam coupled out of the waveguide forming out-coupled light beams.

30 Claims, 20 Drawing Sheets

(56) References Cited

U.S. PATENT DOCUMENTS

| | | | |
|---|---|---|---|
| 2010/0284082 A1* | 11/2010 | Shpunt | G01B 11/25 359/558 |
| 2011/0170108 A1* | 7/2011 | Degertekin | G01N 29/2406 356/454 |
| 2012/0038986 A1* | 2/2012 | Pesach | G01S 17/74 359/572 |
| 2013/0038881 A1 | 2/2013 | Pesach et al. | |
| 2014/0300960 A1* | 10/2014 | Santori | G02B 27/22 359/462 |

OTHER PUBLICATIONS

Li Zhu et al., "Flexible photonic metastructures for tunable coloration", Optica, vol. 2, No. 3, Mar. 2015, pp. 255-258.

\* cited by examiner

LIGHT PROJECTING METHOD AND DEVICE

TECHNICAL FIELD

This disclosure relates to methods and devices for projecting light.

BACKGROUND

Light projecting technologies are essential for enabling several important device functionalities. For example, structured light projecting is deployed in 3D camera modules of mobile phones for recognizing facial features. The projected light reflects off the facial features can be captured by a detector and analyzed by algorithms to "perceive" the topology of the face. Accordingly, authentication, emoji generation, image capture orientation, and other various functionalities can be designed based on inputs of the facial feature recognition.

Current light projecting technologies are disadvantaged for high cost, large size, and low integration, which pose as bottlenecks for the development of device functionalities built upon the light projection. Therefore, improvements over the existing light projecting technologies are desirable for both the consumer market and the industry.

SUMMARY

Various embodiments of the present disclosure include light projecting structures (e.g., waveguides), devices, and systems. According to one aspect, an exemplary waveguide comprises a first surface and a second surface. The first surface comprises a plurality of grating structures. The waveguide is configured to guide an in-coupled light beam to undergo total internal reflection between the first surface and the second surface. The grating structures are configured to disrupt the total internal reflection to cause at least a portion of the in-coupled light beam to couple out of the waveguide from the first surface, the portion of the in-coupled light beam coupled out of the waveguide forming out-coupled light beams. The first surface is in an x-y plane comprising an x-direction and a y-direction perpendicular to each other. The in-coupled light beam propagates inside the waveguide substantially along the x-direction of the x-y plane. The out-coupled light beams propagate substantially along a z-direction normal to the x-y plane. The grating structure is each associated with a grating depth, a duty cycle, a period, and an orientation in the x-y plane with respect to the z-direction. The grating structures at different x-direction positions have at least one of different grating depths or different grating duty cycles. The grating structures at different x-direction positions have different periods. The grating structures at different y-direction positions have different orientations.

In some embodiments, each of the grating structures is associated with an out-coupling efficiency, and the grating depth of the grating structure increases monotonically in the x-direction causing the out-coupling efficiency to increase monotonically along the x-direction.

In some embodiments, each of the grating structures is associated with an out-coupling efficiency, and the duty cycle of the grating structure increases monotonically in the x-direction causing the out-coupling efficiency to increase monotonically along the x-direction.

In some embodiments, each of the grating structures is associated with an out-coupling efficiency, and at least one of the grating depth or the duty cycle of the grating structure varies in the x-direction to cause the out-coupling efficiency to increase monotonically along the x-direction.

In some embodiments, the x-y plane comprises a plurality of regions corresponding to various ranges of positions along the x-direction, the regions comprising a first region and a second region, the first region is the closest to an area of the in-coupled light beam coupling into the waveguide, the second region is the furthest from the area of the in-coupled light beam coupling into the waveguide, the grating structures in the same region have similar out-coupling efficiencies, and a power of the out-coupled light beam from each of the grating structures in the first region is similar to a power of the out-coupled light beam from each of the grating structures in the second region.

In some embodiments, the period decreases monotonically in the x-direction to cause the out-coupled light beams to converge from the first surface in an x-z plane. In another example, the period increases monotonically in the x-direction to cause the out-coupled light beams to diverge from the first surface in an x-z plane.

In some embodiments, the grating structures along the y-direction have orientations rotating in a counter-clockwise direction to cause the out-coupled light beams to diverge from the first surface in a y-z plane. In another example, the grating structures along the y-direction have orientations rotating in a clockwise direction to cause the out-coupled light beams to converge from the first surface in a y-z plane.

In some embodiments, the period decreases monotonically in the x-direction and the grating structures along the y-direction have orientations rotating in a clockwise direction to cause the out-coupled light beams to converge from the first surface. The out-coupled light beams may form an upright cone converging from the first surface.

In some embodiments, the period increases monotonically in the x-direction and the grating structures along the y-direction have orientations rotating in a counter-clockwise direction to cause the out-coupled light beams to diverge from the first surface. The out-coupled light beams may form an inverted cone diverging from the first surface.

In some embodiments, the grating structures are randomly distributed in the x-y plane with respect to corresponding (x, y) positions, and a cross-section of the out-coupled light beams parallel to the first surface comprises an array of dots corresponding to the out-coupled light beams.

According to another aspect, a light projecting system comprises: a waveguide comprising a first surface and a second surface, at least one of the first surface or the second surface comprising a plurality of grating structures, and a light source coupling light into the waveguide to form an in-coupled light beam. The waveguide is configured to guide the in-coupled light beam to undergo total internal reflection between the first surface and the second surface. The grating structures are configured to disrupt the total internal reflection to cause at least a portion of the in-coupled light beam to couple out of the waveguide, the portion of the in-coupled light beam coupled out of the waveguide forming out-coupled light beams. The first surface is in an x-y plane comprising an x-direction and a y-direction perpendicular to each other. The in-coupled light beam propagates inside the waveguide substantially along the x-direction of the x-y plane. The out-coupled light beams propagate substantially along a z-direction normal to the x-y plane. The grating structure is each associated with a grating depth, a duty cycle, a period, and an orientation in the x-y plane with respect to the z-direction. The grating structures at different x-direction positions have at least one of different grating depths or different grating duty cycles. The grating structures at different x-direction positions have different periods. The grating structures at different y-direction positions have different orientations.

In some embodiments, the light projecting system further comprises a detector configured to receive reflections of the out-coupled beams off multiple locations on a distant object to determine distances of the multiple locations relative to the light projecting system.

In some embodiments, the light projecting system further comprises one or more lenses disposed above the first surface. The one or more lenses are configured to receive the out-coupled beams. The one or more lenses are configured to project the out-coupled beams into an environment containing the distant object. In one example, the one or more lenses are configured to collimate the out-coupled beams. In another example, the one or more lenses are configured to converge the out-coupled beams. In another example, the one or more lenses are configured to diverge the out-coupled beams.

According to another aspect, an exemplary waveguide comprises a first surface and a second surface. The second surface comprises a plurality of grating structures. The waveguide is configured to guide an in-coupled light beam to undergo total internal reflection between the first surface and the second surface. The grating structures are configured to disrupt the total internal reflection to cause at least a portion of the in-coupled light beam to couple out of the waveguide from the first surface, the portion of the in-coupled light beam coupled out of the waveguide forming out-coupled light beams. The first surface is in an x-y plane comprising an x-direction and a y-direction perpendicular to each other. The in-coupled light beam propagates inside the waveguide substantially along the x-direction of the x-y plane. The out-coupled light beams propagate substantially along a z-direction normal to the x-y plane. The grating structure is each associated with a grating depth, a duty cycle, a period, and an orientation in the x-y plane with respect to the z-direction. The grating structures at different x-direction positions have at least one of different grating depths or different grating duty cycles. The grating structures at different x-direction positions have different periods. The grating structures at different y-direction positions have different orientations.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Light projection is a key step for various applications such as 3D feature detection and 3D mapping. For example, depth camera modules used for industrial parts inspection and medical examination require determining depth information.

Figure 1:
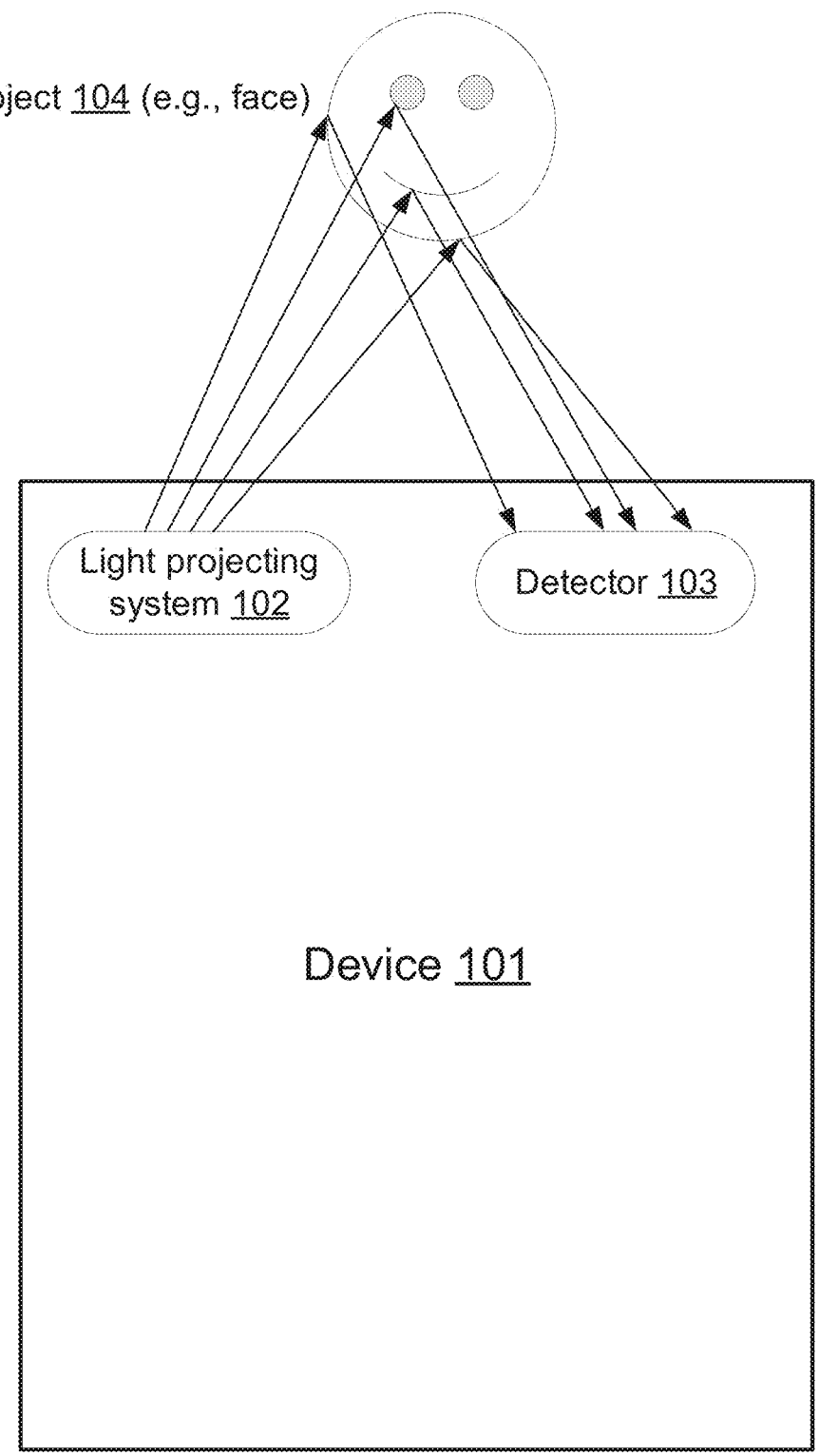
FIG. 1 is a graphical illustration of a light projecting system, in accordance with various embodiments of the present disclosure.

Referring to FIG. 1, in such applications, one or more light sources (e.g., a component of a light projecting system 102) may project structured light beams of a predetermined pattern onto an object (e.g., object 104 such as a face), and reflections of the light beams are captured by a detector (e.g., a detector 103) to measure various optical parameters. The light projecting system 102 and the detector 103 may be disposed on the same device (e.g., a device 101) or different devices. Though shown as separate components, the detector 103 may be a part of the light projecting system 102 and configured to receive reflections of the projected light beams off multiple locations on the distant object 104 to determine distances of the multiple locations relative to the light projecting system 102. The light projecting system 102 may be implemented on various systems or devices, such as mobile phones, computers, pads, wearable devices, vehicles, etc. A perfectly flat reflective plane at the position of the object may be used as a reference, and reflections of the projected light off the reference can be predetermined as reference reflection beams. The facial features can be determined based on the differences between the detected reflection beams and the reference reflection beams, manifested as shifts or distortions of the reference reflection beams. Such determination method may be known as the triangulation method.

Current light projection technologies for projecting the structured light beams employ a projection of a random dot array. The random dot array is achieved by randomly arranging a plurality of lasers, which inevitably drives up the cost and module size and increases integration difficulty.

To at least mitigate the disadvantages of the current technologies, light projecting systems and methods are disclosed. In various embodiments, a light source may couple a light beam into a waveguide via a surface of the waveguide, which then projects multiple beams via gratings on another surface to form distributed output beams. The light source can be a single laser (e.g., an edge-emitting laser, a vertical-cavity surface-emitting laser (VCSEL)), a light-emitting diode, or the like, therefore obviating the need for multiple laser as required in existing technologies. The manufacturing cost can be further lowered, because the waveguide can be fabricated by standard lithography technologies. Moreover, the overall size of the light projecting system can be reduced due to the availability of integrating the waveguide on a substrate. Further, the disclosed waveguide is benefited from the absence of zeroth order diffraction interference, because zeroth order transmission is prohibited by the total internal reflection constraint.

As understood by people of ordinary skill in the art, a waveguide is a structure that guides waves (e.g., electromagnetic waves (light) as in this disclosure) with minimal loss of energy by restricting expansion to one or more dimensions.

To that end, in some embodiments, a light projecting system comprises: a waveguide comprising a first surface and a second surface, the first surface or the second surface comprising a plurality of grating structures; a light source coupling light into the waveguide to form an in-coupled light beam; and a detector. The waveguide is configured to guide the in-coupled light beam to undergo total internal reflection between the first surface and the second surface. The grating structures (e.g., each of the first grating structure) are configured to disrupt the total internal reflection to cause at least a portion of the in-coupled light beam to couple out of the waveguide, the portion of the in-coupled light beam coupled out of the waveguide forming out-coupled light beams. The detector is configured to receive reflections of the out-coupled beams off multiple locations on a distant object to determine distances of the multiple locations relative to the light projecting system. Thus, the topology of the object's surface can be determined. A light projecting device comprising the light source and the light projecting structure (e.g., waveguide) is described in more details below with reference to FIG. 2 and FIG. 3. The light projecting system may further comprise a projection lens structure also described in FIG. 2. The out-coupled light passes through the projection lens structure to reach the distant object.

Figure 2:
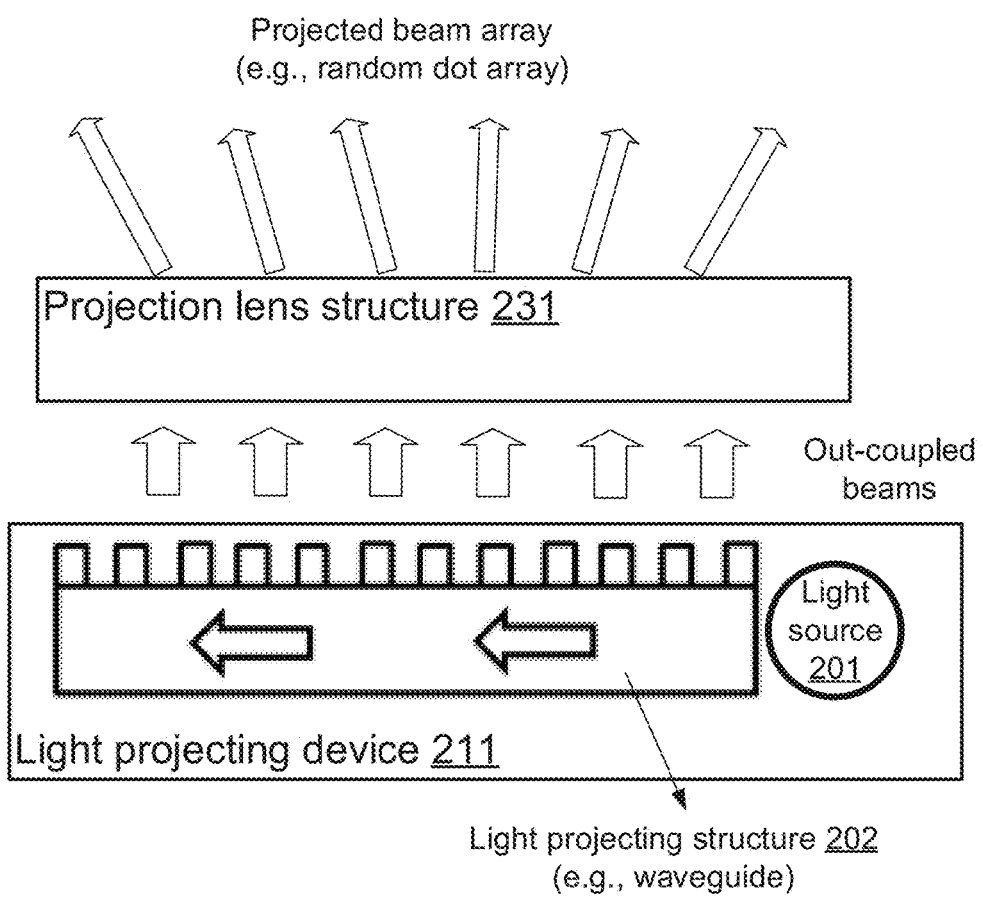
FIG. 2 is a side-view graphical illustration of an exemplary light projecting system for projecting light, in accordance with various embodiments of the present disclosure.

FIG. 2 is a side-view graphical illustration of an exemplary light projecting system 102 for projecting light, in accordance with various embodiments of the present disclosure. The light projecting system 102 may be implemented on various systems or devices, such as mobile phones, computers, pads, wearable devices, vehicles, etc.

As shown in FIG. 2, the exemplary light projecting system 102 may comprise a light projecting device 211 and an optional projection lens structure 231 (or referred to as projector lens). In some embodiments, the light projecting device 211 may comprise a light source 201 and a light projecting structure 202. The light source 201 may comprise a single laser (e.g., an edge-emitting laser, a vertical-cavity surface-emitting laser (VCSEL)), a light-emitting diode (LED) with light collimation, or the like. Alternatively, the light source 201 may comprise multiple lasers or diodes (e.g., an edge-emitting laser array, a VCSEL array, a LED array). The light projecting structure 202 may comprise a waveguide described in more details below. The out-coupled light from the light projecting structure 202 can be surface normal, focusing, or defocusing.

In some embodiments, light beams emerging from the light projecting device 211 (out-coupled beams) may couple out from a surface of the light projecting device 211. Then, optionally, the light beams may pass through the projection lens structure 231 to be projected into the space. That is the projection lens structure 231 (e.g., one or more lenses) may be disposed above the waveguide (e.g., above a first surface of the waveguide described later). The projection lens structure 231 may be configured to receive the out-coupled beams and project the out-coupled beams into an environment containing the distant object. Alternatively, the light beams may be directly projected from the light projecting device 211 into the space. The projection lens structure 231 may comprise various lens or lens combinations (e.g., one to six pieces of separate lenses) for controlling directions of the projected beams.

In some embodiments, the projection lens structure 231 may be configured to increase or decrease the field of view of the projected beam array. For example, the projection lens structure 231 may increase the field of view by diverging the projected beam array, or decrease the field of view by converging the projected beam array.

In some embodiments, the projection lens structure 231 may be configured to collimate the each out-coupled beam. For example, per working distance requirement of different applications, the laser waist of the projected beam array as collimated by the projection lens structure 231 can vary from 10 mm to 1 meter. Thus, the projection lens structure 231 may collimate the output light to form clear image (e.g., a dot array) at a distance of interest (e.g., in the range of 10 cm to 10 m depending on the application).

Figure 3:
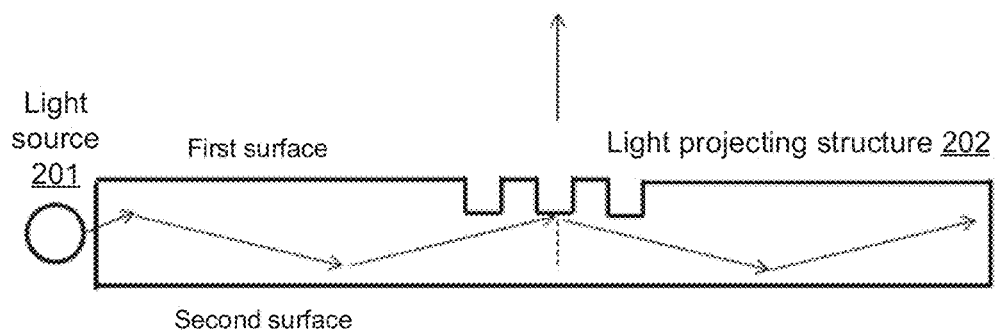
FIG. 3 is a side-view graphical illustration of an exemplary light projecting device, in accordance with various embodiments of the present disclosure.

FIG. 3 is a side-view graphical illustration of an exemplary light projecting device 211 for projecting light, in accordance with various embodiments of the present disclosure. The structure and operations shown in FIG. 3 and presented below are intended to be illustrative.

In some embodiments, the light source 201 emits light to optically couple into the light projecting structure 202 at an in-coupling (coupling light into the light projecting structure 202) area of one surface. The in-coupling setup can comprise end coupling, grating coupling, prism coupling, or the like. After entering the light projecting structure 202, the light undergoes total internal reflection within the light projecting structure 202 between a first surface and a second surface. The light projecting structure 202 may be made of a high refractive index material (e.g., plexiglass, quartz glass, single crystal silicon, fused silica, etc.). In one example, if quartz glass with a refractive index of 1.45 is used, the critical angle for total internal refraction is 44 degrees. Total internal reflection is sustained when the light traveling within the light projecting structure 202 strikes the first or second surface of the light projecting structure 202 at an angle larger than the critical angle with respect to the normal to the surface. The light travelling in the light projecting structure 202 may couple out of the light projecting structure 202 at various out-coupling areas (e.g., on the first surface). For example, the out-coupling areas may be areas having out-coupling structures (e.g., a transmissive grating, a reflective grating, a reflector, etc.).

In some embodiments, the light projecting structure 202 comprises a first surface and a second surface. At least one of the first surface or the second surface comprises a first plurality of grating structures. In this disclosure, the grating structure may refer to a grating (e.g., optical grating), which is a regularly spaced collection of identical, parallel, and elongated elements. In this figure, for example, a profile of a ridge grating is shown, and each ridge grating may comprise identical, parallel, and elongated ridges (see Grating A in FIG. 7A). The light projecting structure guides an in-coupled light beam to undergo total internal reflection between the first surface and the second surface. Each of the first grating structures disrupts the total internal reflection to cause at least a portion of the in-coupled light beam to couple out of the light projecting structure, the portion of the in-coupled light beam coupled out of the light projecting structure being an out-coupled light beam. Thus, one in-coupled beam travelling inside the waveguide may couple out the waveguide through the gratings to obtain multiple out-coupled light beams. The various in-coupling and out-coupling mechanisms are described in more details below.

FIG. 4A-FIG. 4I are side-view graphical illustrations of in-coupling from a light source to a light projecting structure (e.g., a planar waveguide), in accordance with various embodiments of the present disclosure. The structure and operations shown in FIG. 4A-FIG. 4I and presented below are intended to be illustrative. Assuming, the planar waveguide is in a horizontal position, in FIG. 4A, FIG. 4F, FIG. 4G, FIG. 4H, and FIG. 4I, the light source 201 may emit light substantially within a horizontal plane, while the out-coupling light propagates substantially within a vertical plane. In FIG. 4B, FIG. 4C, FIG. 4D, and FIG. 4E, the light source 201 may emit light substantially within a vertical plane, while the out-coupling light propagates substantially within the vertical plane. The horizontal and vertical planes are relative to each other and do not constitute limitations relative to the environment.

Figure 4A:
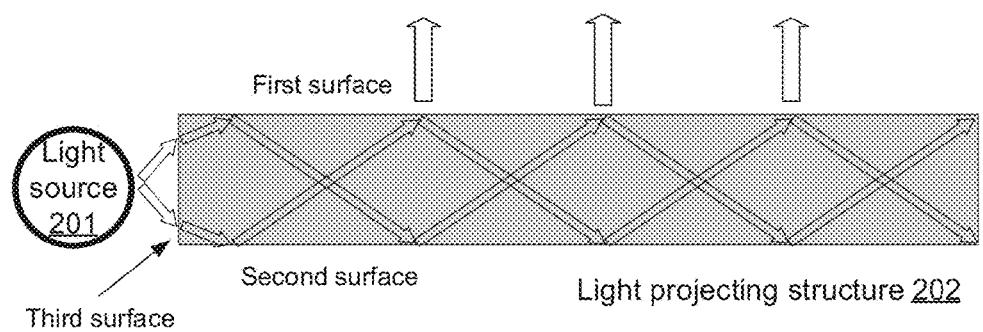
FIG. 4A-FIG. 4I are side-view graphical illustrations of in-coupling from a light source to a light projecting structure, in accordance with various embodiments of the present disclosure.

In some embodiments, as shown in FIG. 4A, light emitted from the light source 201 may couple into the light projecting structure 202 by "end coupling" via a surface of the light projecting structure 202. The refractive index of the environment of the in-coupling light, the refractive index of the light projecting structure 202, the wavelength, and the incident angle of the in-coupling light on the third surface of the light projecting structure 202 may comply with "end coupling" conditions as understood by people skilled in the art. Inside the light projecting structure 202, the light undergoes total internal reflection between the first and second surfaces of the light projecting structure 202, and out-couples from the first surface of the light projecting structure 202. Alternatively, if the light source 201 is large compared to the third surface, a lens may be used to focus the light from the light source 201 into the light projecting structure 202 by "end coupling."

Figure 4B:
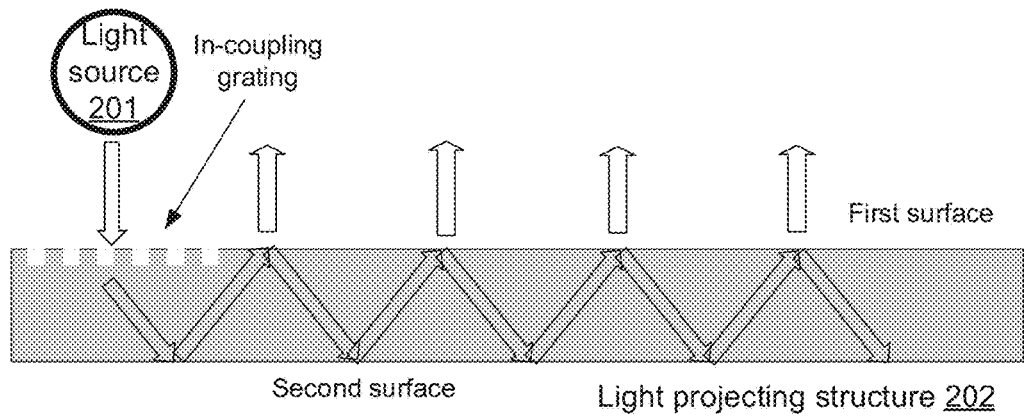
Figure 4C:
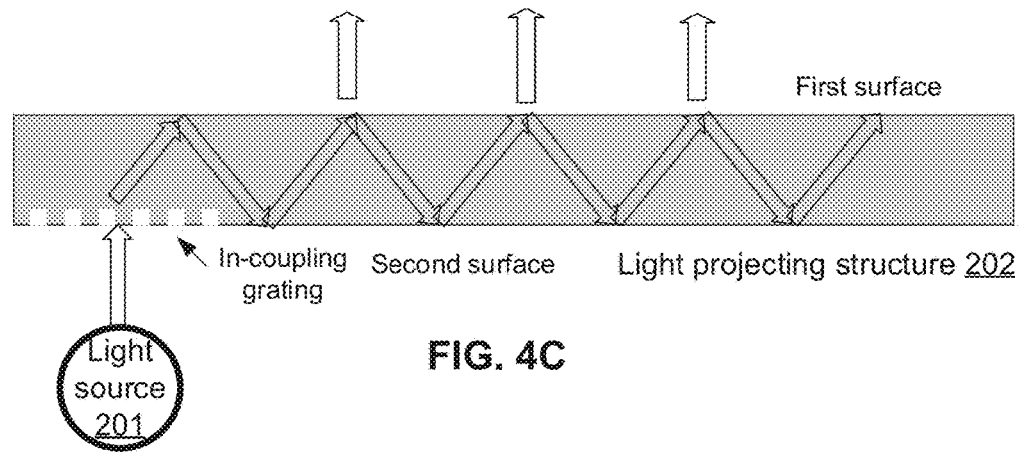

In some embodiments, as shown in FIG. 4B and FIG. 4C, light emitted from the light source 201 may couple into the light projecting structure 202 by "grating coupling" via an in-coupling grating. That is, the light projecting structure may further comprise a second plurality of grating structures on at least one of the first surface or the second surface. A light source couples light into the light projecting structure via the second plurality of grating structures to form the in-coupled light beam. In FIG. 4B, the in-coupling grating may be fabricated on the first surface of the light projecting structure 202. Though the in-coupling grating is shown to be level with the first surface, it may be alternatively elevated or depressed from the first surface, as long as maintaining the subsequent total internal reflection. The refractive index of the environment of the in-coupling light, the refractive index of the light projecting structure 202, the geometry of the in-coupling grating, the wavelength, and the incident angle of the in-coupling light on the third surface of the light projecting structure 202 comply with "grating coupling" conditions as understood by people skilled in the art. Inside the light projecting structure 202, the light undergoes total internal reflection between the first and second surfaces of the light projecting structure 202, and out-couples from the first surface of the light projecting structure 202. FIG. 4C is similar to FIG. 4B except that the in-coupling grating may be fabricated on the second surface of the light projecting structure 202.

In some embodiments, as shown in FIG. 4D to FIG. 4I, light emitted from the light source 201 may couple into the light projecting structure 202 by "prism coupling" via a prism. That is, the light projecting structure may further comprise a prism disposed on at least one of: the first surface, the second surface, or the third surface. A light source couples light into the light projecting structure via the prism to form the in-coupled light beam. In this disclosure, "being disposed on" an object also includes "being disposed close to" the object. Any gap between the prism and the light projecting structure 202 may be filled with an optical glue or another refractive index matching material.

Figure 4D:
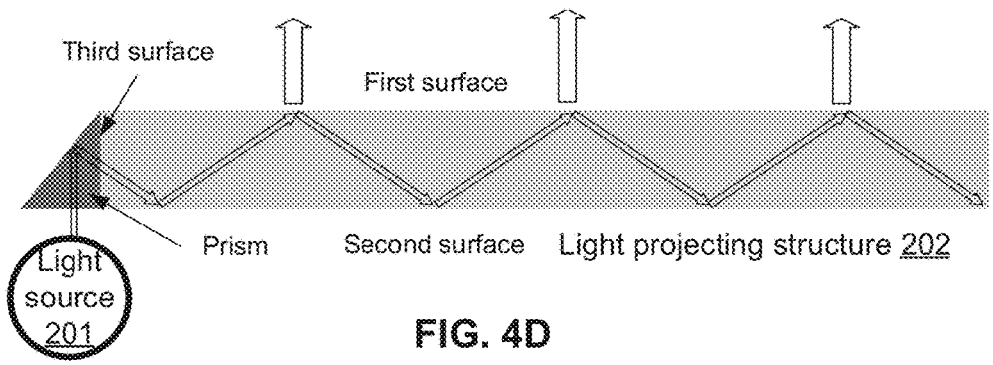
Figure 4E:
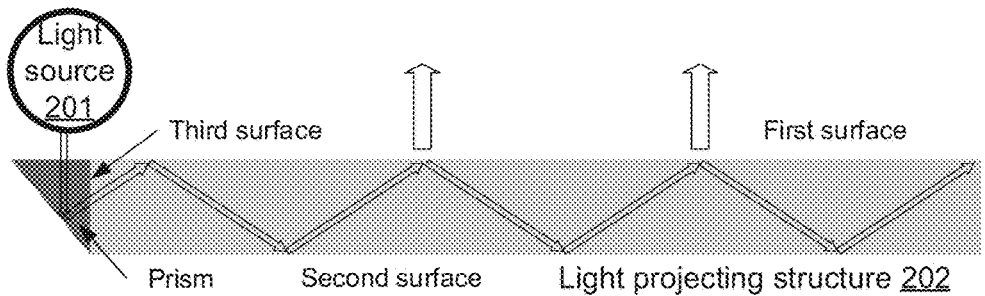

In FIG. 4D, the prism may be disposed on the third surface of the light projecting structure 202. The light source 201 may be disposed at the side the second surface and emit light into the prism. The light undergoes one reflection within the prism and couples from the prism into the light projecting structure 202 at the third surface. The refractive index of the prism, the refractive index of the light projecting structure 202, the geometry of the prism, and the incident angle of the light from the light source 201 comply with "grating coupling" conditions as understood by people skilled in the art. Inside the light projecting structure 202, the light undergoes total internal reflection between the first and second surfaces of the light projecting structure 202, and out-couples from the first surface of the light projecting structure 202. FIG. 4E is similar to FIG. 4D except that the prism may be inverted, so that the light source 201 is disposed at the side the first surface.

Figure 4F:
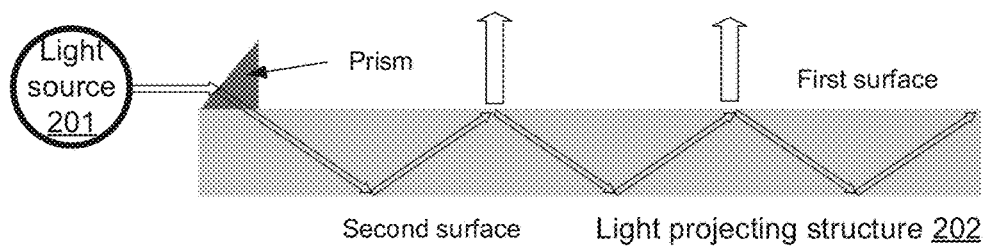
Figure 4G:
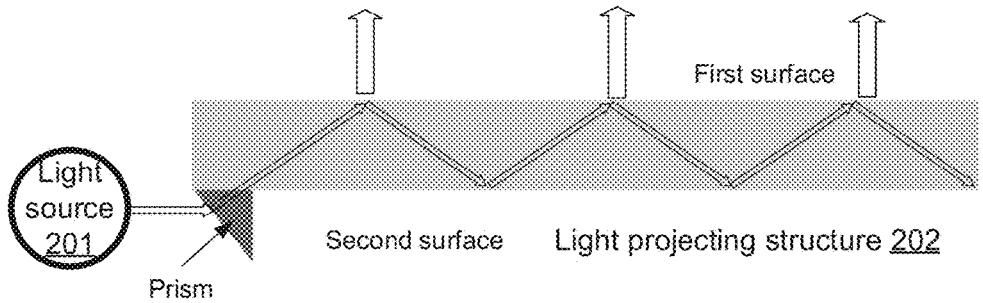

In FIG. 4F, the prism may be disposed on the first surface of the light projecting structure 202. The light source 201 may emit light that enters the prism. At the first surface between the prism and the light projecting structure 202, evanescent mode of the light may couple into the light projecting structure 202. The refractive index of the prism, the refractive index of the light projecting structure 202, the geometry of the prism, and the incident angle of the light from the light source 201 comply with "phase matching" conditions as understood by people skilled in the art. Inside the light projecting structure 202, the light undergoes total internal reflection between the first and second surfaces of the light projecting structure 202, and out-couples from the first surface of the light projecting structure 202. FIG. 4G is similar to FIG. 4D except that the prism may be disposed on the second surface of the light projecting structure 202.

Figure 4H:
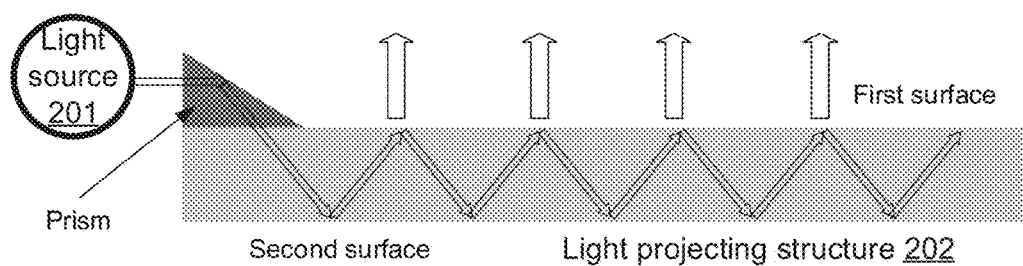
Figure 4I:
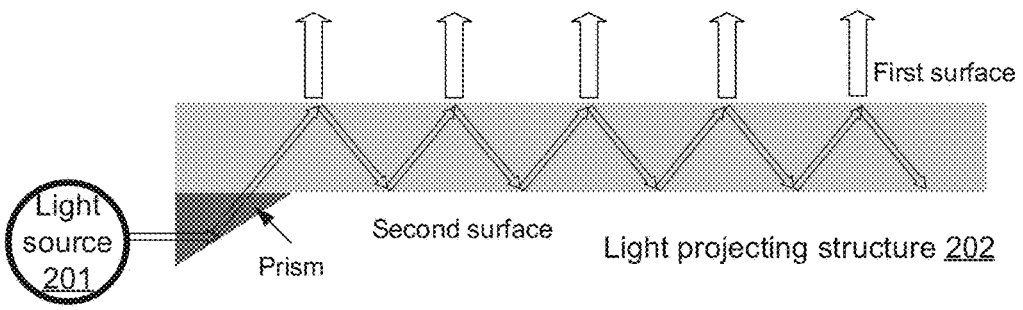

In some embodiments, FIG. 4H is similar to FIG. 4D where the light undergoes one reflection at the slope surface within the prism before coupling into the light projecting structure 202, except that the prism is disposed on the first surface. FIG. 4I is similar to FIG. 4H, except that the prism is disposed on the second surface. The prism used in FIG. 4F and FIG. 4G may be a regular prism, and the prism used in FIG. 4H and FIG. 4I may be a wedge prism.

FIG. 5A-FIG. 5F are side-view graphical illustrations of out-coupling from a light projecting structure (e.g., a planar waveguide), in accordance with various embodiments of the present disclosure. The structure and operations shown in FIG. 5A-FIG. 5F and presented below are intended to be illustrative. For simplicity, in-coupling and light traveling inside the light projecting structure 202 are omitted in FIG. 5A-FIG. 5F.

In some embodiments, the light projecting structure comprises a planar waveguide. The first surface and the second surface are parallel to each other and are the largest surfaces of the planar waveguide. The out-coupled light beams couple out of the light projecting structure from the first surface. The first surface or the second surface comprises the first plurality of grating structures. When the second surface comprises the first plurality of grating structures, the light projecting structure may further comprise a metal layer disposed on the second surface. Alternatively, the first grating structures comprise volumetric gratings between the first surface and the second surface. That is, the in-coupled light inside the light projecting structure 202 undergoes total internal reflection. While the rest continues total internal reflection, a portion of the light may break free of the total internal reflection when striking an out-coupling structure on the first surface, on the second surface, or inside the waveguide, and subsequently exit the waveguide from one of its surfaces (e.g., the first surface). Various out-coupling structures (transmissive grating, reflective grating, reflector, etc.) are described below.

Figure 5A:
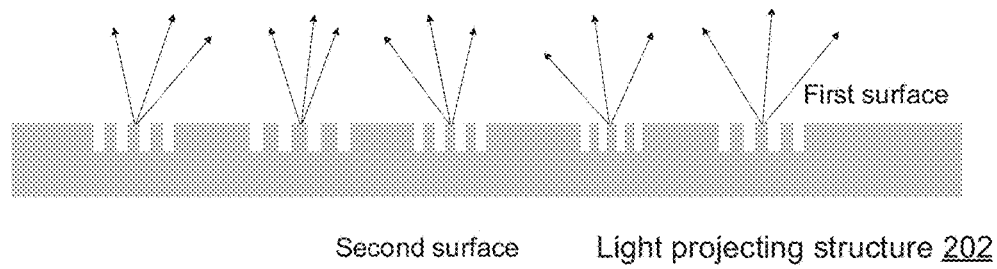
FIG. 5A-FIG. 5F are side-view graphical illustrations of out-coupling from a light projecting structure, in accordance with various embodiments of the present disclosure.
Figure 5B:
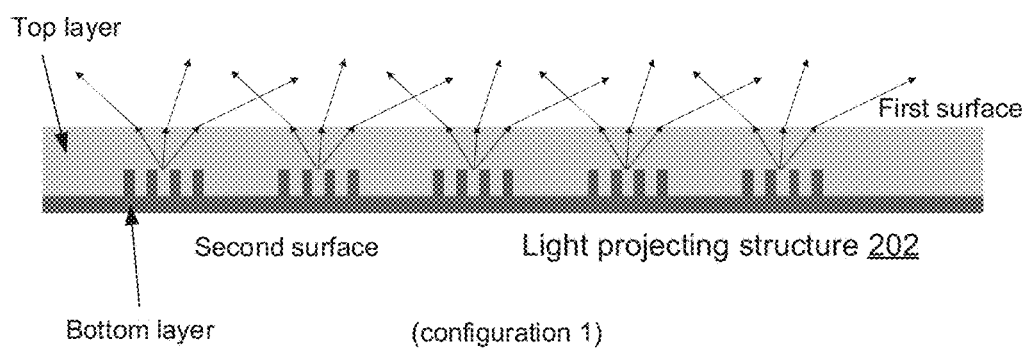
Figure 5B:
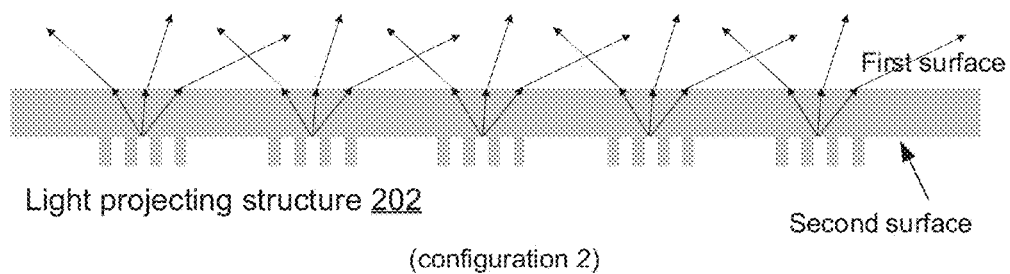
Figure 5C:
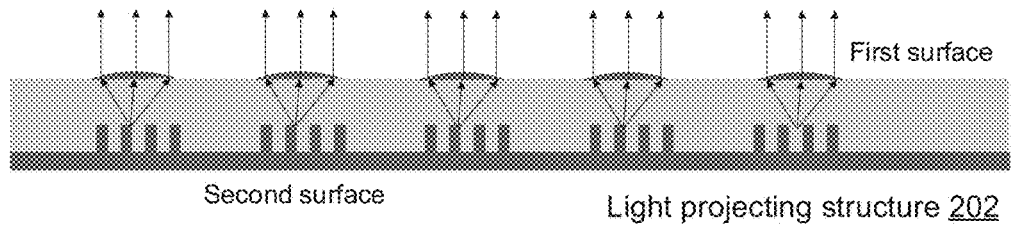

In FIG. 5A-FIG. 5C, the illustrated waveguide structure including gratings may allow one or multiple diffraction orders to couple out of the waveguide. In some embodiments, as shown in FIG. 5A, gratings may be fabricated at various out-coupling areas on the first surface of the light projecting structure 202. The out-coupling areas may correspond to areas of total internal reflection, and a portion of the light traveling inside the waveguide may couple out of the waveguide from each of the out-coupling areas (e.g., into the air).

In some embodiments, as shown in FIG. 5B (configuration 1), diffraction gratings may be fabricated at various out-coupling areas on the second surface of the light projecting structure 202. That is, that waveguide may comprise: (1) a bottom layer with gratings fabricated on top, the bottom layer having a first refractive index, and (2) a top layer with a complementary shape with the bottom layer. The out-coupling areas may correspond to areas of total internal reflection, and a portion of the light striking each of the out-coupling areas may bend toward the first surface and subsequently couple out of the waveguide from the first surface.

Similarly, FIG. 5B also illustrates a configuration 2 with gratings fabricated on the second surface. The gratings may have the same refractive index as the waveguide or have a different refractive index.

In some embodiments, as shown in FIG. 5C, a micro lens array may be disposed on the first surface corresponding to the positions of the out-coupling areas in FIG. 5B, such that the out-coupling light can be collimated, made parallel, or otherwise controlled.

Figure 5D:
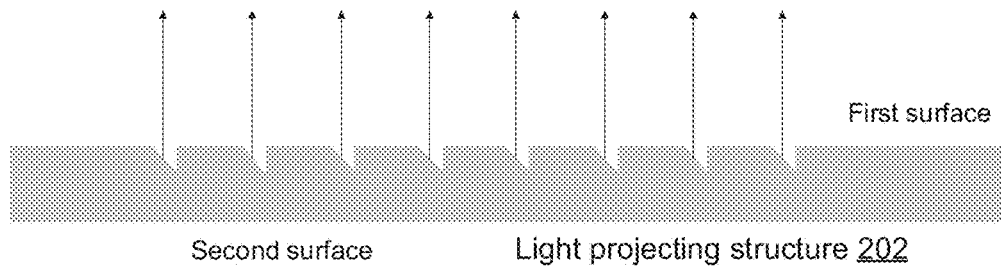

In some embodiments, as shown in FIG. 5D, refractive gratings may be fabricated at various out-coupling areas on the first surface of the light projecting structure 202. For example, gratings of an triangle profile as shown may be etched away from the first surface. The gratings correspond to the out-coupling areas, from which a portion of the total internal reflection light may couple out of the waveguide.

Figure 5E:
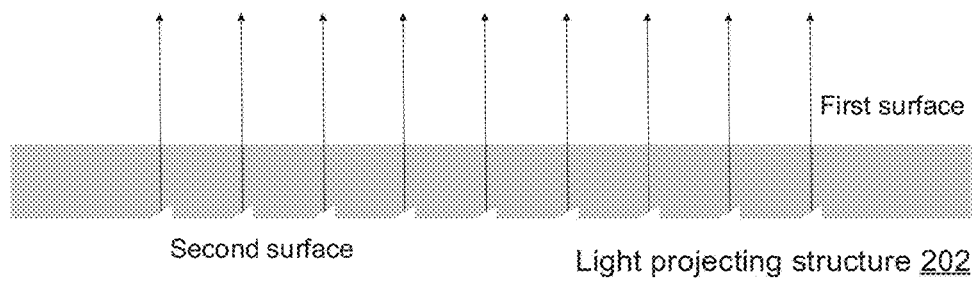

In some embodiments, as shown in FIG. 5E, reflective gratings may be fabricated at various out-coupling areas on the second surface of the light projecting structure 202. For example, gratings of an triangle profile as shown may be etched away from the second surface. The gratings correspond to the out-coupling areas, from which a portion of the total internal reflection light may be reflected towards the first surface and subsequently couple out of the waveguide.

Figure 5F:
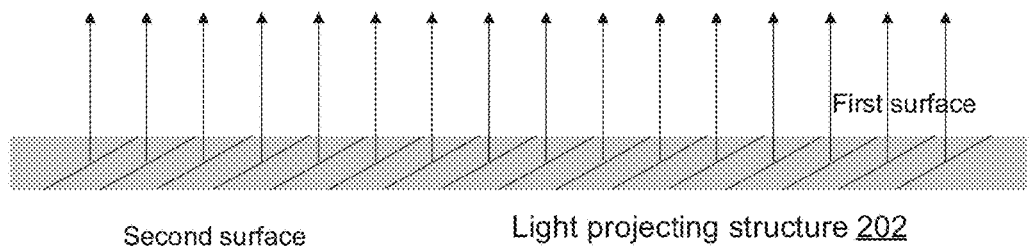

In some embodiments, as shown in FIG. 5F, volumetric gratings may be fabricated within the waveguide. For example, the periodicity of the volumetric gratings is in alternating refractive index between repeating periodic sections. The refractive index changing interfaces may correspond to the out-coupling areas, from which a portion of the total internal reflection light may be reflected towards the first surface and subsequently couple out of the waveguide.

Various configurations of the first grating structures may control the out-coupled light beams. As described below, the out-coupling efficiency may be determined by the grating depth (also referred to as "thickness") and grating duty cycle (FIG. 6A-FIG. 6C), the angle of the out-coupled light beam with respect to surface normal may be determined by the grating period (FIG. 8A-FIG. 8B), and the rotation angle of the out-coupled light beam may be determined with the grating orientation (FIG. 9A-FIG. 9B).

In some embodiments, the gratings (first grating structures) disrupt the total internal reflection to cause the out-coupled light beams to project from the first surface, the out-coupled light beams forming an array of dots on a plane parallel to the first surface. In one example, the out-coupled light beams propagates normal to the first surface, and a cross-section of the out-coupled light beams parallel to the first surface comprises a random array of dots corresponding to the out-coupled light beams. In another example, the out-coupled light beams form an inverted cone of light, and a cross-section of the inverted cone parallel to the first surface comprises a random array of dots corresponding to the out-coupled light beams (FIG. 7B). As described below, the dot pattern is not limited to the illustrated examples, and may comprise various other configurations. The descriptions below with reference to FIG. 6A to FIG. 9B may borrow the coordinate system shown in FIG. 10 or FIG. 11. That is, the first surface (or the second surface) of the waveguide is in an x-y plane comprising an x-direction and a y-direction perpendicular to each other, the in-coupled light beam propagates inside the light projecting structure substantially along the x-direction of the x-y plane, and the out-coupled light beams propagate substantially along a z-direction normal to the x-y plane. The grating structures may be randomly distributed in the x-y plane with respect to corresponding (x, y) positions. In some embodiments, the dimension of the grating is about 2 μm to 30 μm, the number of gratings on the waveguide is about couple hundreds to one million, and the average pitch (separation between closest gratings) is about 5 μm to 100 μm.

Figure 6A:
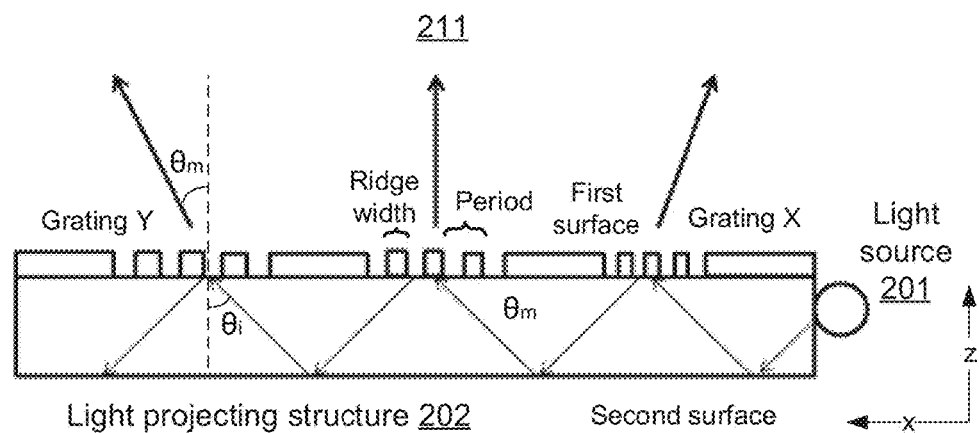
FIG. 6A is a side-view graphical illustration of an exemplary light projecting device for projecting light, in accordance with various embodiments of the present disclosure.

FIG. 6A is a side-view graphical illustration of an exemplary light projecting device 211 for projecting light, in accordance with various embodiments of the present disclosure. The structure and operations shown in FIG. 6A and presented below are intended to be illustrative. FIG. 6A may correspond to FIG. 5A described above, and the grating out-coupling mechanism is described below.

In some embodiments, the direction of the out-coupled light beam may follow the following formula:

$$\sin\theta_m = \frac{m\lambda}{\Gamma} - n \times \sin\theta_i \quad (1)$$

where m is the diffraction order, λ is the wavelength, F is the period of the grating, n is the refractive index of the waveguide, $\theta_m$ is the angle of the out-coupling beam with respect to the normal of the first surface, and $\theta_i$ is the angle of the beam undergoing total internal reflection inside the waveguide with respect to the normal of the first surface.

In some embodiments, the described out-coupling (light undergoing total internal reflection inside a waveguide couples out of the waveguide from areas having grating structures) occurs when the effective index of the +1 diffractive order (m=1) matches the effective index of the mode supported by the waveguide. Thus, to obtain out-coupling beams propagating parallel to the normal, and therefore (that is, $\theta_m$=0), the grating period (labeled as "period" in the figure) can be obtained as:

$$\Gamma = \frac{\lambda}{n \times \sin\theta_i} \quad (2)$$

For example, when the waveguide is quartz glass (n=1.45), λ=940 nm, and $\theta_i$=60°, Γ can be obtained to be 748 nm. Accordingly, the grating period can affect the angle of the out-coupling beam with respect to the normal.

Substituting equation (2) into equation (1), it can be obtained that:

$$\sin\theta_m = (m-1) \times n \times \sin\theta_i \quad (3)$$

Further, based on the condition for total internal reflection with a critical angle $\theta_c$:

$$\theta_i > \theta_c = \arcsin(1/n) \quad (4)$$

It can be obtained that sin $\theta_i$>1/n, and therefore:

$$n \times \sin\theta_i > 1 \quad (5)$$

To satisfy both (3) and (5) with m being an integer and |sin $\theta_m$|≤1, m can only be 1. Therefore, the described out-coupling (light undergoing total internal reflection inside a waveguide coupling out of the waveguide from areas having the grating structures) may yield only the m=+1 order of out-coupled light, without interference of light of other transmissive diffraction orders. This is one of the advantages absent in existing light projecting technologies.

Figure 6B:
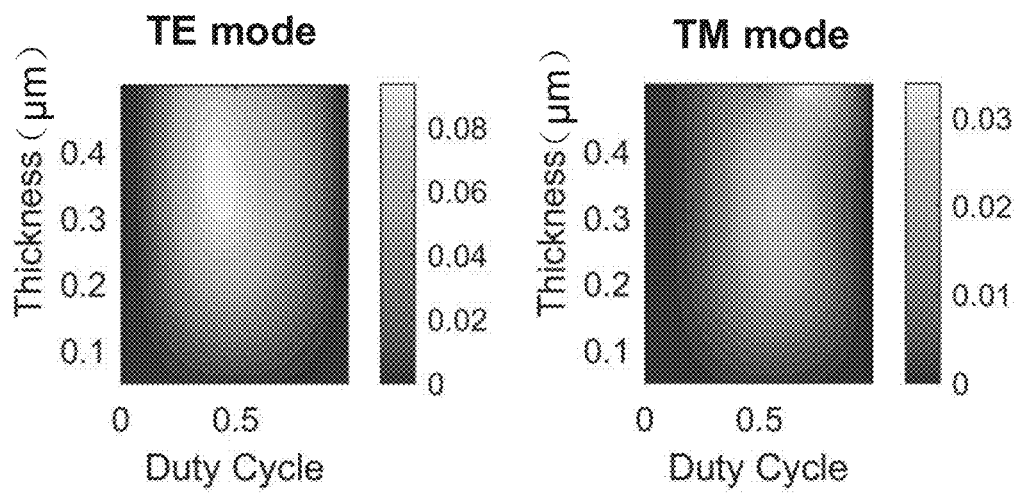
FIG. 6B is a graphical illustration of grating coupling efficiency with respect to grating depth and duty cycle, in accordance with various embodiments of the present disclosure.

FIG. 6B is a graphical illustration of simulated coupling efficiency with respect to grating depth and duty cycle, in accordance with various embodiments of the present disclosure.

In some embodiments, the grating has a geometry for a high coupling efficiency, that is, the percentage (portion) of the light undergoing total internal reflection that couples out of the waveguide at the grating. Thus, in this context, the coupling efficiency can be understood as an out-coupling efficiency. When the grating period is fixed, the coupling efficiency is determined by the grating depth and duty cycle (percentage of each period that the ridge structure occupies). Referring to the labels "ridge width" and "period" in FIG. 6A and FIG. 9A, the duty cycle may be obtained as dividing the ridge width by the period. The duty cycle may be alternatively be referred to as a filling factor. For FIG. 6B, when λ=940 nm, and $\theta_i$=60°, Γ can be obtained to be 748 nm.

FIG. 6B shows simulated coupling efficiencies for two different waveguide modes (that is, TE mode and TM mode light traveling in the waveguide). The x-axis represents the duty cycle, and the y-axis represents the grating depth. Higher coupling efficiencies are represented by brighter areas. For the TE mode, the highest coupling efficiency is 9.8%, occurring at duty cycle of 0.43 and a thickness of 0.35 μm. For the TM mode, the highest coupling efficiency is 2.8%, occurring at duty cycle of 0.52 and a thickness of 0.3 μm. Therefore, the grating depth and duty cycle can be designed to achieve various coupling efficiencies. Further, by tuning the grating depth, a coupling efficiency higher than the illustrated 9.8% efficiency can be achieved.

Figure 6C:
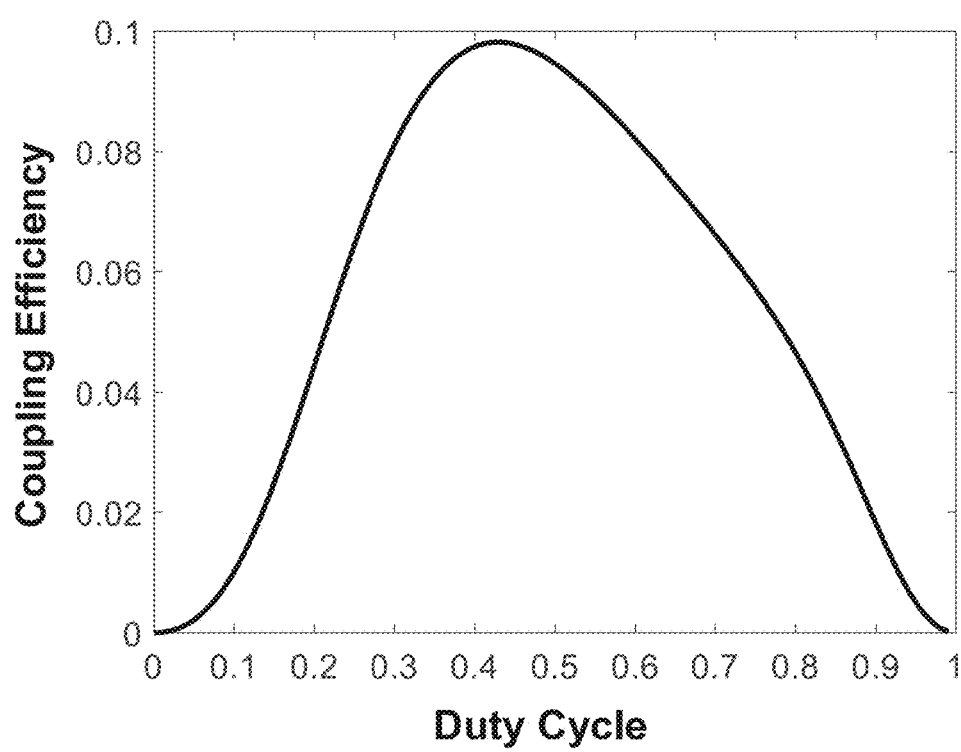
FIG. 6C is a graphical illustration of the grating coupling efficiency with respect to the grating duty cycle, in accordance with various embodiments of the present disclosure.

In one example, extracting from the TE mode diagram in FIG. 6B, when λ=940 nm, $\theta_i$=60°, Γ=748 nm, and thickness=0.35 μm, the coupling efficiency with respect to the duty cycle can be obtained as shown in FIG. 6C. The same peak coupling efficiency is at 9.8%, with a duty cycle of 0.43 and a thickness of 0.35 μm.

In some embodiments, as a portion of the light undergoing total internal reflection in the waveguide couples out of the waveguide at each grating, the power of the light remaining in the waveguide decreases after each out-coupling event. To ensure that out-coupled light beams in the dot array have about similar powers, the gratings can be designed such that the coupling efficiency increases as the distance of the grating from the light source 201 increases. For example, referring back to FIG. 6A, grating Y can have a larger coupling efficiency than that of grating X, by tuning the duty cycle and grating depth, to ensure that the out-coupled light from grating Y and grating X have similar powers.

Thus, in some embodiments, each of the grating structures is associated with an out-coupling efficiency. The out-coupling efficiency increases monotonically along the x-direction. The out-coupling efficiency depends on a grating depth and a duty cycle of the grating structure. At least one of a grating depth or a duty cycle of the grating structure varies in the x-direction to cause the out-coupling efficiency to increase monotonically along the x-direction. In one example, a grating depth of the grating structure increases monotonically in the x-direction, causing the out-coupling efficiency to increase monotonically along the x-direction. In another example, a duty cycle of the grating structure increases monotonically in the x-direction causing the out-coupling efficiency to increase monotonically along the x-direction. In another example, the x-y plane comprises a plurality of regions corresponding to various ranges of positions along the x-direction, the regions comprising a first region and a second region. The first region is the closest to an area of the in-coupled light beam coupling into the light projecting structure. The second region is the furthest from the area of the in-coupled light beam coupling into the light projecting structure. The grating structures in the same region have similar out-coupling efficiencies. The monotonic increase of the out-coupling efficiency along the x-direction causes a power of the out-coupled light beam from each of the grating structures in the first region to be similar to a power of the out-coupled light beam from each of the grating structures in the second region.

Figure 7A:
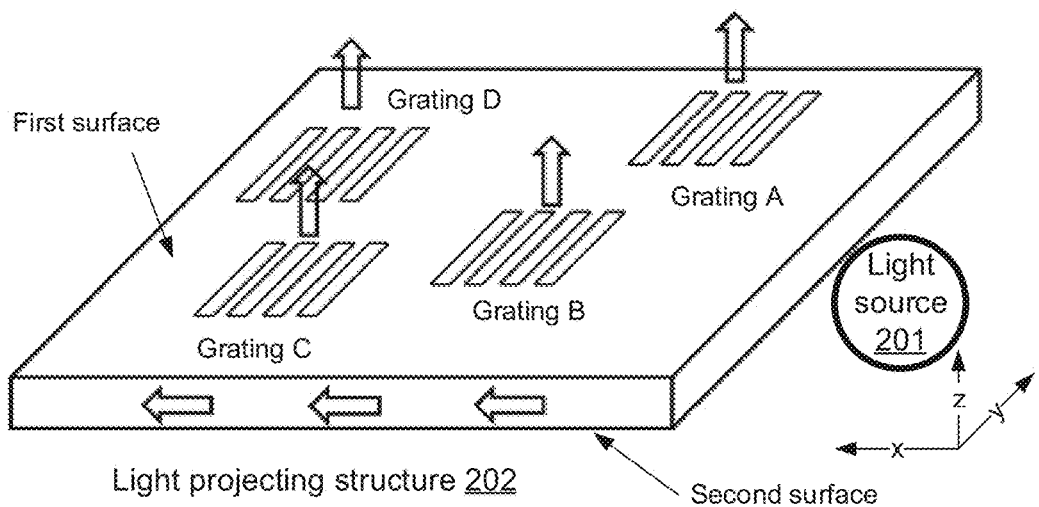
FIG. 7A is a perspective-view graphical illustration of a light projecting device for projecting light, in accordance with various embodiments of the present disclosure.
Figure 7B:
FIG. 7B is a graphical illustration of a dot array corresponding to the out-coupled light beams, in accordance with various embodiments of the present disclosure.

FIG. 7A is a perspective-view graphical illustration of a light projecting device 211 for projecting light, in accordance with various embodiments of the present disclosure. The structure and operations shown in FIG. 7A and presented below are intended to be illustrative.

As shown in FIG. 7A, in some embodiments, the light projecting structure 202 may comprise a planar waveguide with gratings fabricated on the first surface. The light projecting structure 202 shown in FIG. 7A may be similar to the light projecting structure 202 shown in FIG. 6A, except that the out-coupling light beams in FIG. 7A are normal to the first surface. The light source 201 may comprise one or more lasers or LEDs with light collimation. The lasers or LEDs may be arranged in a row to couple into a side surface of the planar waveguide.

In some embodiments, the gratings (e.g., grating A, grating B, grating C, grating D, etc.) may be fabricated at random locations on the first surface. The gratings may have the same grating period. From each grating, one out-coupling light beam couples out of the waveguide. Accordingly, when viewed from top, the out-coupling light beams may form a random dot array as shown in FIG. 7B. The illustrated dot array pattern is merely exemplary. Based on configuring the grating structures (e.g., by tuning period, orientation, depth, duty cycle, (x, y, z) positions on the waveguide, number, etc.), any dot array pattern can be achieved to satisfy the application requirements.

Figure 8A:
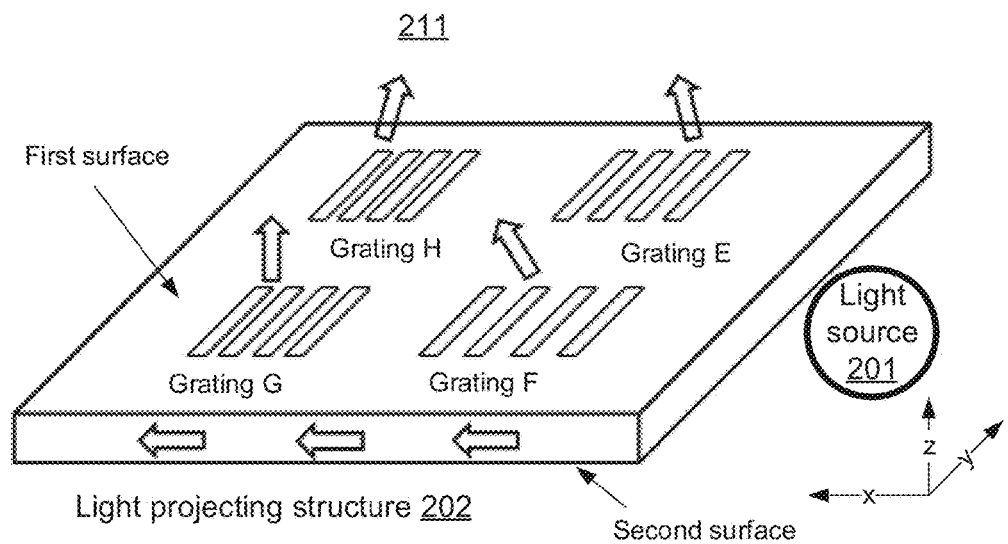
FIG. 8A is a perspective-view graphical illustration of a light projecting device for projecting light, in accordance with various embodiments of the present disclosure.
Figure 9A:
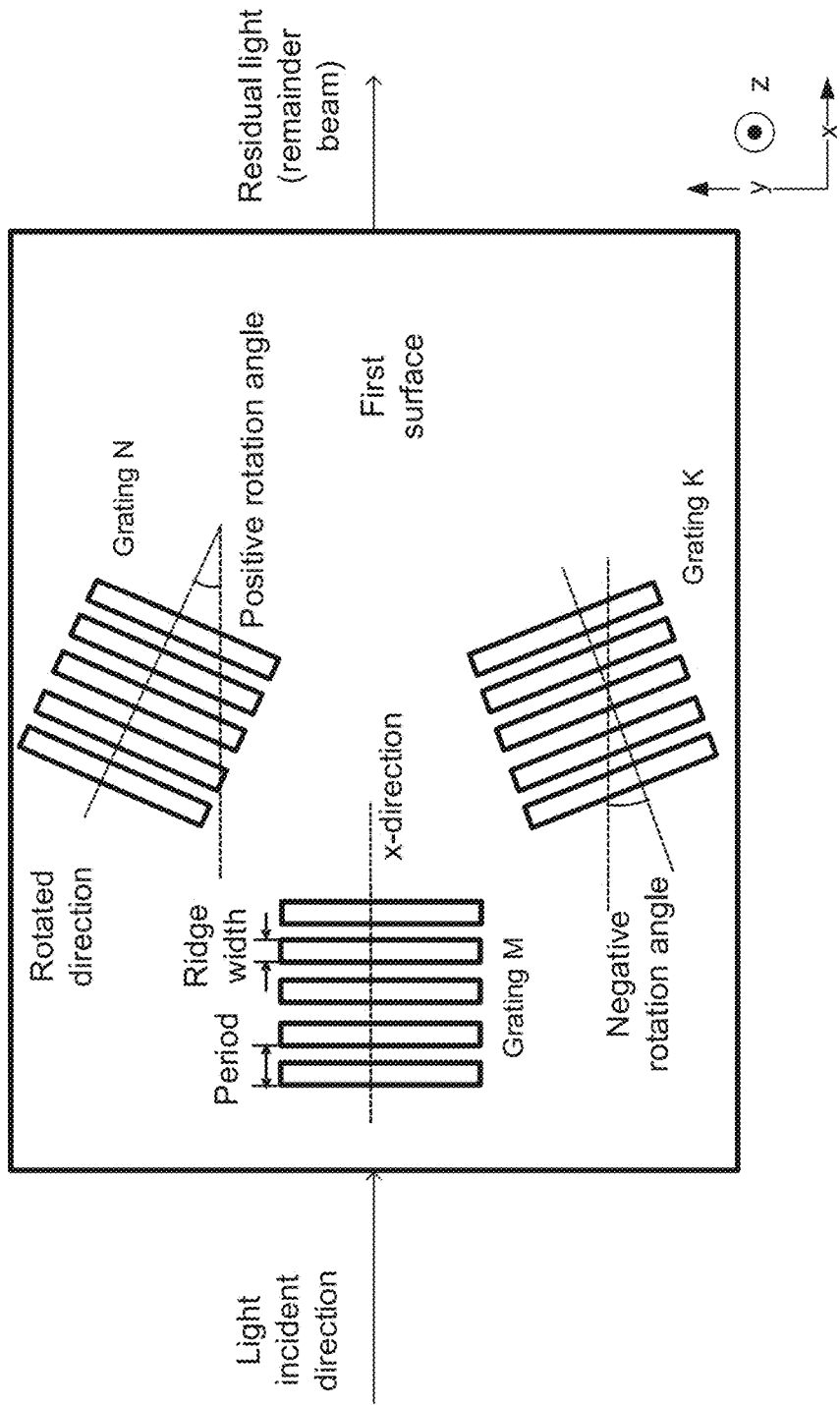
FIG. 9A is a top-view graphical illustration of exemplary gratings on the first surface, in accordance with various embodiments of the present disclosure.
Figure 9B:
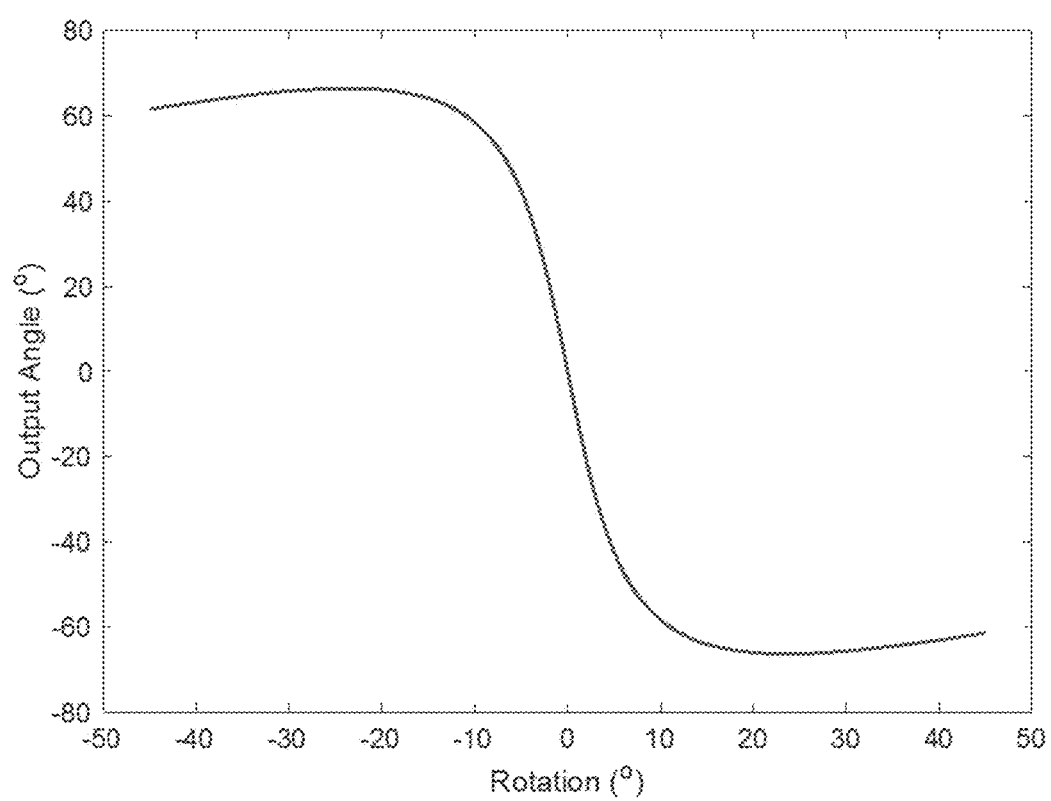
FIG. 9B is a graphical illustration of the out-coupled light beam angle with respect to the grating rotation angle, in accordance with various embodiments of the present disclosure.

FIG. 8A is a perspective-view graphical illustration of a light projecting device 211 for projecting light, in accordance with various embodiments of the present disclosure. The structure and operations shown in FIG. 8A and presented below are intended to be illustrative.

Figure 8B:
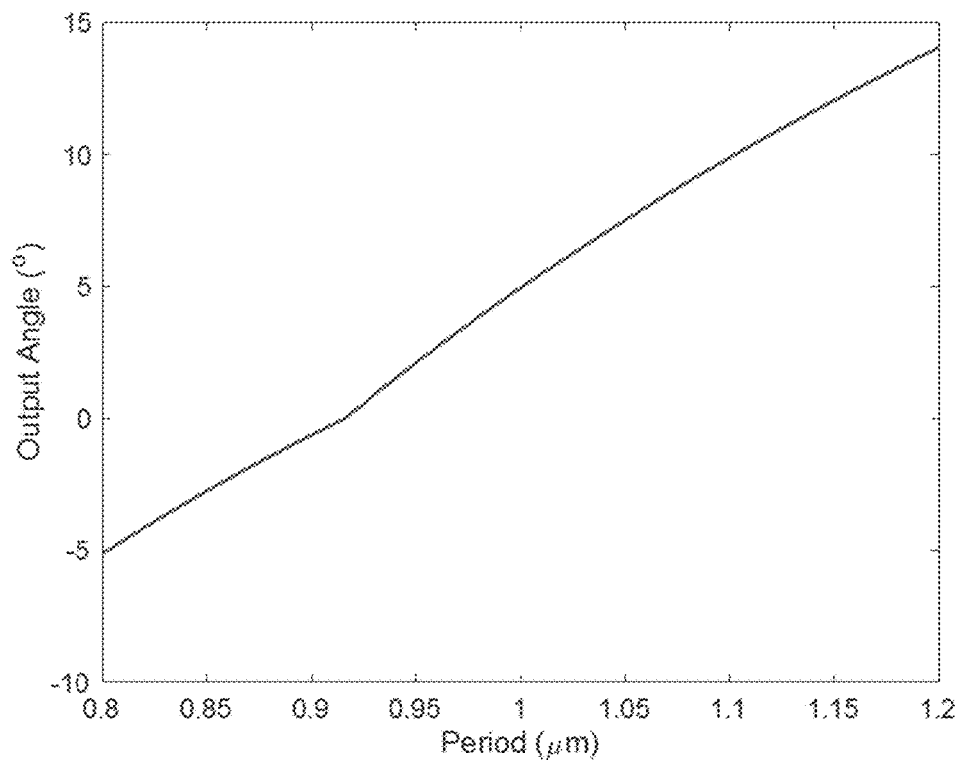
FIG. 8B is a graphical illustration of the out-coupled light beam angle with respect to the grating period, in accordance with various embodiments of the present disclosure.

The light projecting device 211 may be similar in FIG. 7A and FIG. 8A, also providing a random dot array, except that the gratings in FIG. 8A may have different grating periods. As shown in FIG. 8A, in some embodiments, the gratings (e.g., grating E, grating F, grating G, grating H, etc.) may have different grating periods F. According to equation (1) described above, $\theta_m$ changes with the grating period F. That is, the out-coupling light beam may propagate at various angles with respect to the normal direction. Thus, the change in $\theta_m$ may also increase the randomness of the dot array. A plot of the out-coupled light beam angle (in the x-z plane with respect to the z-direction) against the grating period is shown in FIG. 8B. As shown, within the same vertical plane normal to the first surface and along the direction of the light traveling inside the waveguide (x-direction), the out-coupled light beam can be manipulated between −5 to 15 degrees with respect to the normal direction, by changing the grating period. Though the out-coupled beam may also have a y-direction component, FIG. 8A and FIG. 8B focus on the x-direction component.

Thus, in some embodiments, the grating structures are each associated with a period, and the period varies for the grating structures along the x-direction. The variation of the period causes the out-coupled light beams to couple out of the waveguide at a range of angular deviations in the x-direction. In one example, the period monotonically varies along the x-direction. The monotonic variation of the period along the x-direction causes the out-coupled light beams to couple out of the light projecting structure at a range of angular deviations in the x-direction.

FIG. 9A is a top-view graphical illustration of exemplary gratings on the first surface, in accordance with various embodiments of the present disclosure. As shown in FIG. 9A, in some embodiments, the gratings may have various orientations within the x-y plane. The grating orientation can be illustrated with reference to the orientation of the ridges of the grating. For example, grating M may be oriented with its ridges perpendicular to the x-direction, grating N may be oriented with its ridges at a positive rotation angle to the x-direction, and grating K may be oriented with its ridges at a negative rotation angle to the x-direction.

In some embodiments, the in-coupled light travels from left to right inside the waveguide in the x-direction. The out-coupled light from grating M has a y-direction component of zero. That is, ignoring the x-direction component, the out-coupled light from gratin M propagates in the z-direction. The out-coupled light from grating N of a positive rotation angle has a negative y-direction component. That is, ignoring the x-direction component, the out-coupled light from gratin N propagates in the z-negative-y direction. The out-coupled light from grating K of a negative rotation angle has a positive y-direction component. That is, ignoring the x-direction component, the out-coupled light from gratin K propagates in the z-positive-y direction. Thus, considering the out-coupled beams from the gratings M, N, and, K, the out-coupled beams converge in the y-z plane. FIG. 9A is a simplified illustration of the grating orientation control described below in FIG. 10 for obtaining converging out-coupled beams. The reverse of FIG. 9B for obtaining diverging out-coupled beams is described below in FIG. 11.

A plot of the out-coupled light beam angle (in the y-z plane with respect to the z-direction) against the grating rotation angle (with respect to the x-direction) is shown in FIG. 9B. In this plot, the out-coupled light beam angle can be manipulated between about −70 to 70 degrees with respect to the reference direction, by changing the grating orientation between 45 and −45 degrees with respect to the x-direction. FIG. 9B is merely exemplary, and alternative direction reference systems may be used. Though the out-coupled beam may also have a x-direction component, FIG. 9A and FIG. 9B focus on the y-direction component.

Thus, in some embodiments, the grating structures are each associated with a degree of rotation with respect to the z-direction, and the degree of rotation varies for the grating structures along the y-direction. The variation of the degree of rotation causes the out-coupled light beams to couple out of the waveguide at a range of angular deviations in the y-direction. In one example, the degree of rotation varies monotonically clockwise or counter-clockwise. The monotonic variation of the degree of rotation causes the out-coupled light beams to propagate at various y-direction components.

Figure 10:
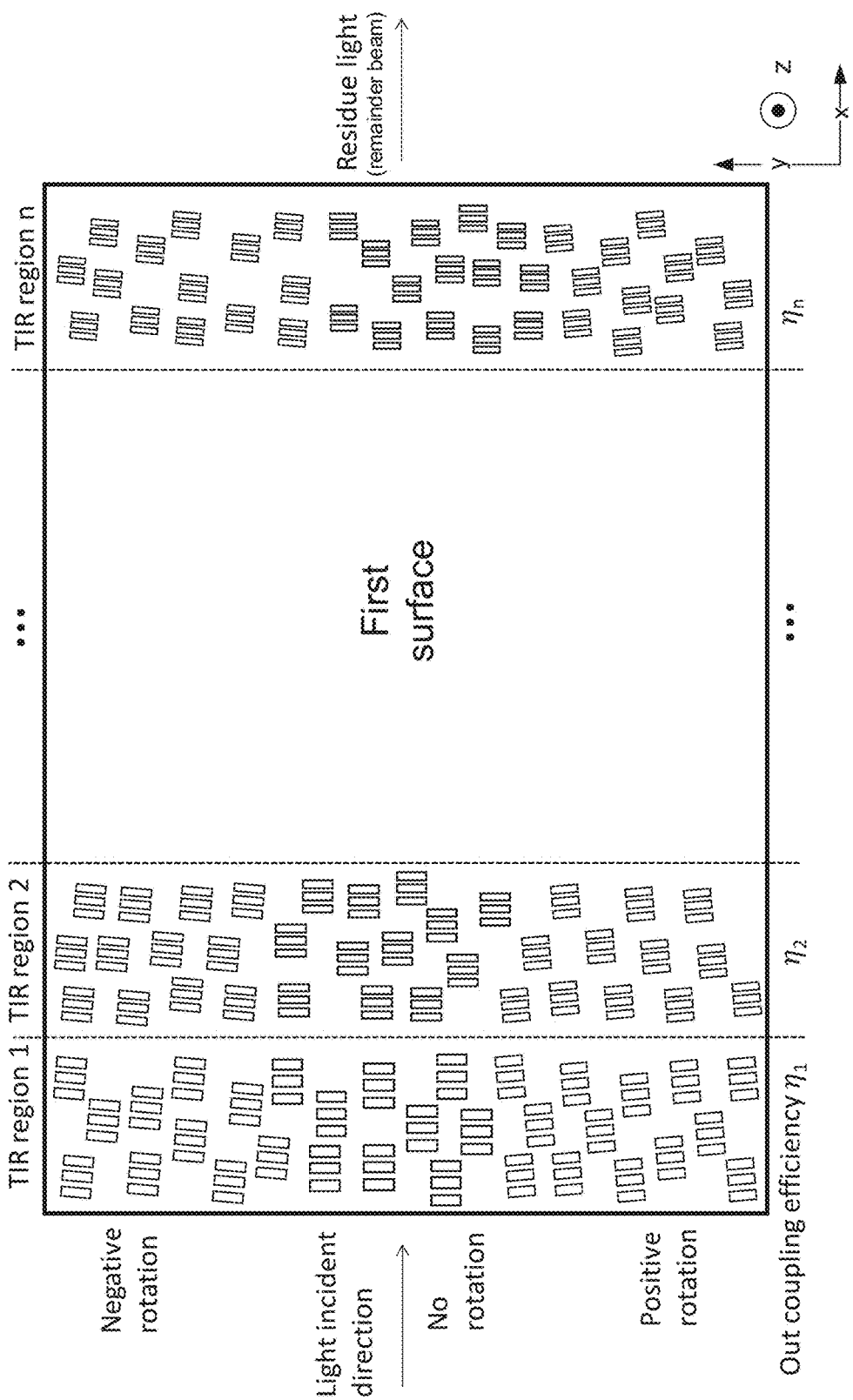
FIG. 10 is a top-view graphical illustration of exemplary gratings on the first surface, in accordance with various embodiments of the present disclosure.
Figure 11:
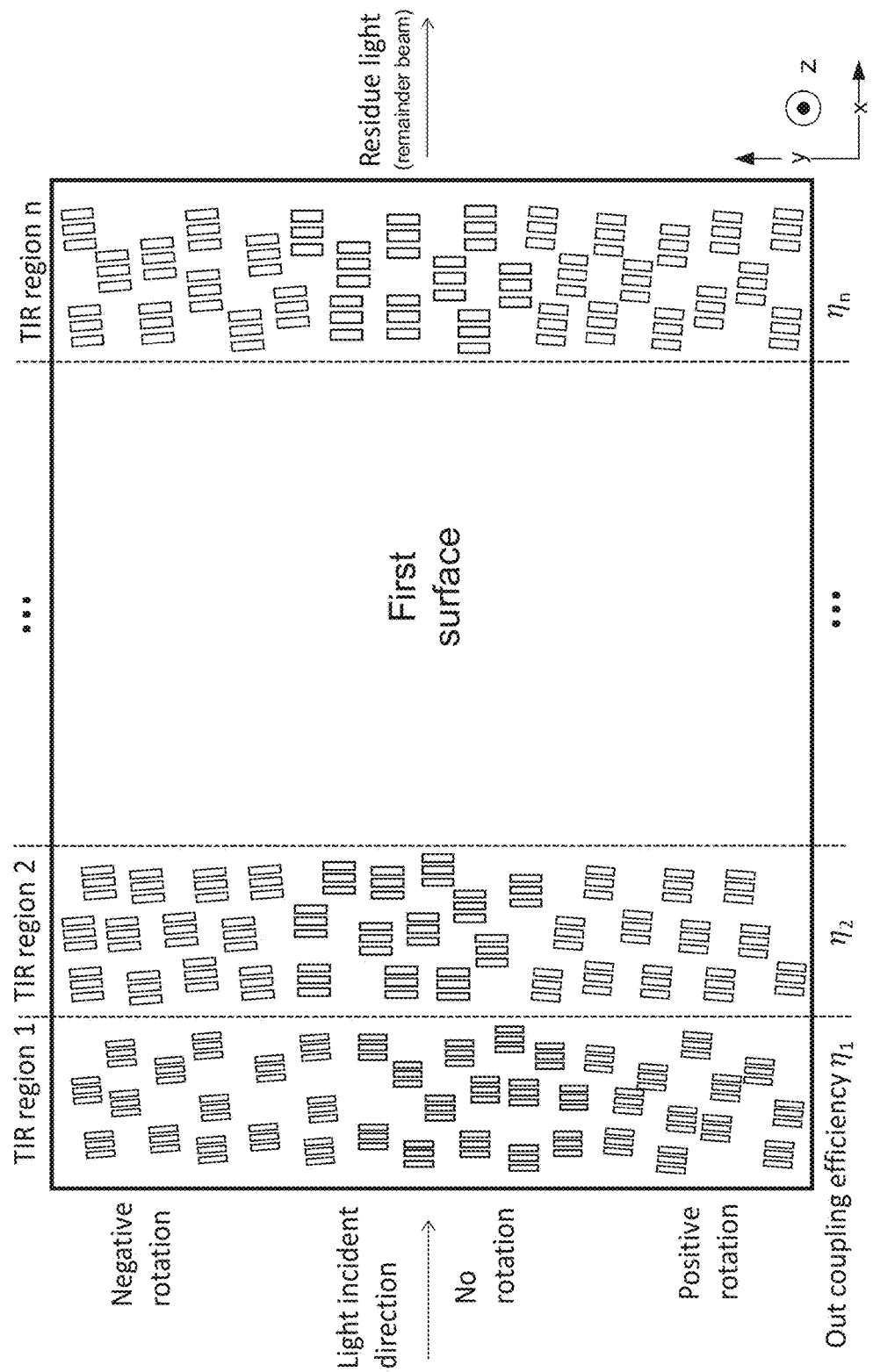
FIG. 11 is a top-view graphical illustration of exemplary gratings on the first surface, in accordance with various embodiments of the present disclosure.

Each of FIG. 10 and FIG. 11 is a top-view graphical illustration of exemplary gratings on the first surface (first grating structures), in accordance with various embodiments of the present disclosure. Alternatively, the gratings may be fabricated on the second surface or according to another configuration shown in FIG. 5A-FIG. 5F above. The structure and operations shown in FIG. 10 and FIG. 11 and presented below are intended to be illustrative. The gratings in FIG. 10 and FIG. 11 may have combined controlling the out-coupling efficiency by the grating depth and duty cycle, controlling the angle of the out-coupled light beam with respect to normal by the grating period, and controlling the rotation angle of the out-coupled light beam by the grating orientation described above from FIG. 6A-FIG. 9B. As shown in FIG. 10 and FIG. 11, the planar waveguide is in an x-y plane, and the z-direction is the surface normal direction (which is perpendicular to the x-y plane). In this disclosure, the x-direction and y-direction are defined as shown in this figure. The z-direction is normal to the x-y plane and pointing out of the plane of the paper. The x, y, and z directions may also be referred to as positive x, y, and z directions, and their opposite directions may be referred to as negative x, y, and z directions. The in-coupled light may enter the waveguide from left, portions of which couple out of the waveguide through the gratings, with some residue light (also referred to as remainder light) left and continuing in the x-direction. The in-coupled light may originate from one or more lasers. The first grating structure is each associated with a grating depth, a duty cycle, a period, and an orientation in the x-y plane with respect to the z-direction. The first grating structures at different x-direction positions have at least one of different grating depths or different grating duty cycles. The first grating structures at different x-direction positions have different periods. The first grating structures at different y-direction positions have different orientations.

In some embodiments, the waveguide further comprises an elongated third surface. The position of the third surface relative to the first and second surfaces are described above. A light source couples light into the waveguide via the third surface (in the "light incident direction" shown in FIG. 10 and FIG. 11) to form the in-coupled light beam. The light from the light source is collimated into a line shape corresponding to the elongated third surface. In one example when a single laser is used, the laser output beam may be collimated by a collimation lens or lens array into a line shape, which lies along the third surface of the planar waveguide and can subsequently couple into the planar waveguide through the third surface.

In some embodiments, the divergence of the out-coupled beams may be controlled via the grating orientation and the grating period. For example, the divergence of the out-coupled beams in the y-direction may be controlled via the grating orientation, and the divergence of the out-coupled beams in the x-direction may be controlled via the grating period. In the y-direction of FIG. 10 and FIG. 11, the angle of the out-coupled beam in the y-z plane (a plane containing the y-direction axis and the z-direction axis) with respect to the z-direction varies with the rotational orientation of the grating. Detailed explanations can be referred to the discussion above with reference to FIG. 9A and FIG. 9B. In the x-direction of FIG. 10 and FIG. 11, the angle of the out-coupled beam in the x-z plane (a plane containing the x-direction axis and the z-direction axis) with respect to the z-direction varies with the grating period. The output angle of the out-coupled beam increases with the grating period. Detailed explanations can be referred to the discussion above with reference to FIG. 8A and FIG. 8B. Therefore, the grating orientation and the grating period may be controlled to obtain converging out-coupled beams (e.g., in a cone shape converging from the first surface) or diverging out-coupled beams (e.g., in an inverted cone shape diverging from the first surface).

FIG. 10 shows an exemplary grating orientation and period control for obtaining converging out-coupled beams, and FIG. 11 shows an exemplary grating orientation and period control for obtaining diverging out-coupled beams.

In some embodiments, FIG. 10 and FIG. 11 illustrate exemplary grating structure with grating orientation control. In FIG. 10, the grating orientation may change from bottom to top in the y-direction, such that the gratings appear to rotate clockwise with respect to the normal to the first surface. That is, in FIG. 10, assuming that the y-axis direction is the reference direction, the gratings in the middle horizontal section of the first surface have no rotation, the gratings in the bottom horizontal section of the first surface have negative rotations (tilting left), and the gratings in the top horizontal section of the first surface have positive rotations (tilting right), so that the out-coupled beam from the topmost grating has the most negative y-direction component, and the out-coupled beam from the bottommost grating has the most positive y-direction component, consistent with FIG. 9B and its description. That is, the grating structures along the y-direction may have orientations rotating in a clockwise direction to cause the out-coupled light beams to converge from the first surface in a y-z plane. In FIG. 11, the grating orientation may change from bottom to top in the y-direction, such that the gratings appear to rotate counter-clockwise with respect to the normal to the first surface. That is, in FIG. 11, assuming that the y-axis direction is the reference direction, the gratings in the middle horizontal section of the first surface have no rotation, the gratings in the bottom horizontal section of the first surface have positive rotations (tilting right), and the gratings in the top horizontal section of the first surface have negative rotations (tilting left), so that the out-coupled beam from the topmost grating has the most positive y-direction component, and the out-coupled beam from the bottommost grating has the most negative y-direction component, consistent with FIG. 9B and its description. That is, the grating structures along the y-direction have orientations rotating in a counter-clockwise direction to cause the out-coupled light beams to diverge from the first surface in a y-z plane. Thus, changing the grating orientation (e.g., clockwise or counter-clockwise monotonically in the y-direction) expands the out-coupled light from being only in the surface normal direction (normal to the first surface) to having a certain field-of-view in the y-direction. The field of view in the y-direction converges in FIG. 10 and diverges in FIG. 11, contributing to the convergence and divergence of the out-coupled beams respectively.

In some embodiments, FIG. 10 and FIG. 11 also illustrate exemplary grating structure with grating period control. In FIG. 10, the grating period decreases in the x-direction, so that the first out-coupled beam in the x-direction has the most positive x-direction component, and the last out-coupled beam in the x-direction has the most negative x-direction component, consistent with FIG. 8B and its description. Thus, the out-coupled beams converge in the x-direction. In FIG. 11, the grating period increases in the x-direction, so that the first out-coupled beam (coupled out of the first grating) in the x-direction has the most negative x-direction component, and the last out-coupled beam (coupled out of the last grating) in the x-direction has the most positive x-direction component, consistent with FIG. 8B and its description. Thus, changing the grating period (e.g., increasing or decreasing monotonically in the x-direction) expands the out-coupled light from being only in the surface normal direction (normal to the first surface) to having a certain field-of-view in the x-direction. The period may decrease monotonically in the x-direction to cause the out-coupled light beams to converge from the first surface in an x-z plane. The period may increase monotonically in the x-direction to cause the out-coupled light beams to diverge from the first surface in an x-z plane. The field of view in the x-direction converges in FIG. 10 and diverges in FIG. 11, contributing to the convergence and divergence of the out-coupled beams respectively.

Referring to FIG. 10, the grating period's decrease (e.g., monotonic decrease) in the x-direction combined with the grating orientation's clockwise rotation in the y-direction (e.g., monotonic clockwise rotation with respect to the z-direction for gratings in the y-direction) may cause the out-coupled light beams to converge from the first surface. That is, the period decreases monotonically in the x-direction and the grating structures along the y-direction have orientations rotating in a clockwise direction to cause the out-coupled light beams to converge from the first surface. In one example, the converged beams may form an upright cone projected out from the first surface and converging towards a point above the first surface, but once past the converging point, the beams will diverge to form an inverted cone of light on top of the upright cone.

Referring to FIG. 11, the grating period's increase (e.g., monotonic increase) in the x-direction combined with the grating orientation's counter-clockwise rotation in the y-direction (e.g., monotonic counter-clockwise rotation with respect to the z-direction for gratings in the y-direction) may cause the out-coupled light beams to diverge from the first surface. That is, the period increases monotonically in the x-direction and the grating structures along the y-direction have orientations rotating in a counter-clockwise direction to cause the out-coupled light beams to diverge from the first surface. In one example, the diverged beams may form an inverted cone projected out from the first surface and diverging from the first surface.

In some embodiments, the light power in the waveguide decreases along the propagation direction (x-direction in FIG. 10 and FIG. 11), and hence the power of the total-internal-reflection beams impinging on the gratings for out-coupling decreases along the propagation direction. To obtain a uniform output power for the out-coupled beams, the out-coupling efficiency may increase along the propagation direction to compensate for the loss of power. The out-coupling efficiency may increase monotonically in the propagation direction. The out-coupling efficiency can be varied by changing the grating depth and/or grating duty cycle (see discussion of FIG. 6B and FIG. 6C above). Any out-coupling efficiency level can be achieved with an appropriate combination of grating depth and grating duty cycle pair. The grating thickness may or may not increase monotonically in the propagation direction. The grating duty cycle may or may not increase monotonically in the propagation direction. Each of the grating thickness and the grating duty cycle does not have to obey any monotonic trend in the propagation direction, as long as the combinations of the grating thickness and the grating duty result in increasing out-coupling efficiencies for the out-coupled beams along the propagation direction.

Referring to FIG. 10 and FIG. 11, in some embodiments, the first surface can be visualized as strips of total intern reflection regions (TIR region 1, TIR region 2, etc.), with corresponding out-coupling efficiencies $\theta_1$, $\eta_2$ ... $\eta_n$ increasing from $\eta_1$ to $\eta_n$ in order to maintain a constant output power. In one example, the relationship may be $P_{n-1} \times \eta_{n-1} \times P_n \times \eta_n$ where $P_n = P_{n-1} \times (1 - \eta_{n-1})$. To change the coupling efficiency $\eta$, one can change the duty cycle and/or the grating depth.

In some embodiments, the distribution of the grating locations on the first surface in FIG. 10 and FIG. 11 may be random. That is, notwithstanding complying with the described trend in grating period, grating depth, grating duty cycle, and grating orientation, if the first surface (or the second surface) is in an x-y plane, the gratings are randomly distributed in the x-y plane with respect to corresponding (x, y) positions. Here, the random distribution means that the gratings may not be fixed at periodic locations (e.g., 2D lattice locations, evenly spaced locations, etc.) on the first or the second surface. The random dot array described herein may correspond to this random distribution of the grating locations. The random distribution of the grating locations can minimize the algorithm error that is detrimental to detection based on the out-coupled beams. The algorithm error is often caused by periodic or other non-random pattern trends, for which the algorithm run by the detector for detecting differences between reflections from different structured light beams would have a hard time to distinguish one part of the patterns from another part as they appear to be the same.

Although the gratings in FIG. 10 and FIG. 11 are shown as three ridges, each grating can contain any number of ridges or another alternative grating structure (e.g., rib, buried ridge, diffused ridge, etc.). The ridge profile may be square, round, triangular, etc. Though shown as square in FIG. 10 and FIG. 11, the outer shape of each grating may alternatively be circular, oval, rectangular, etc. The size of grating may vary from 1 period (around 1 μm) to the whole pixel size (around 30 μm). In some embodiments, if the grating is sufficiently large such that the diffraction limit can be ignored, the dot size will increase with the grating size, and the size of the grating can be manipulated to obtain the ideal size for the dot (beam size of projected light beam). For example, if an application requires more dots, the size of the grating can be reduced to pack more dots into a fixed area (e.g., the first surface). If an application requires brighter dots (higher signal-to-noise ratio), the size of the grating can be increased since larger dots have more power and thus are brighter.

Figure 12:
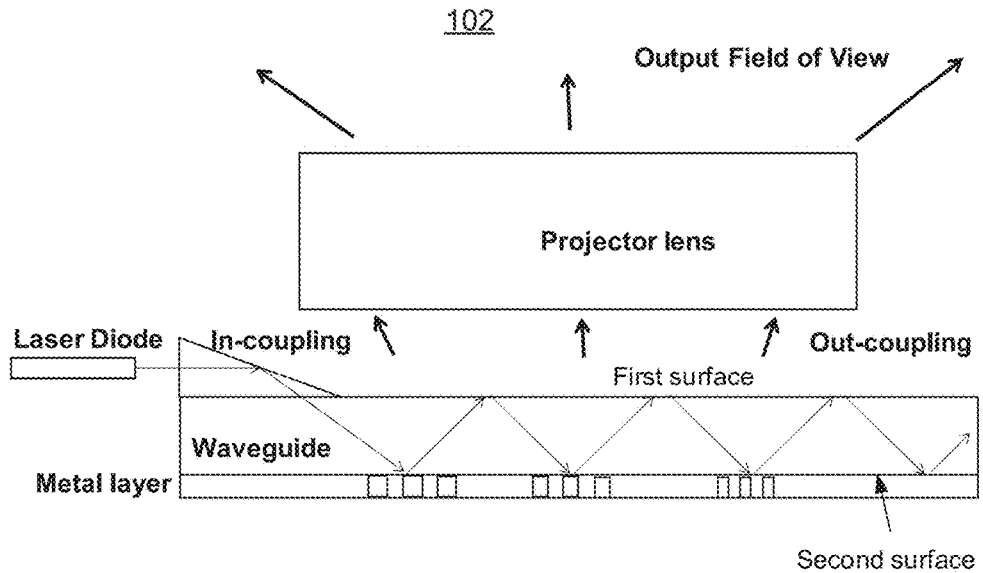
FIG. 12 is a graphical illustration of an exemplary light projecting system for projecting light, in accordance with various embodiments of the present disclosure.

FIG. 12 is a graphical illustration of an exemplary light projecting system 102 for projecting light, in accordance with various embodiments of the present disclosure. The light projecting system 102 may implement the in-coupling mechanism described above with reference to FIG. 4H and the out-coupling mechanism described above with reference to FIG. 5B (configuration 2).

In some embodiments, the waveguide further comprises a reflective layer disposed on the second surface and covering the grating structures. The reflective layer may comprise one or more sub-layers of metal (e.g., alloy) and/or non-metal (e.g., dielectric). In one example, the reflective layer comprises at least one of the reflective layer comprises one or more sub-layers, each sub-layer comprising at least one of: aluminum, silver, gold, copper, titanium, chromium, nickel, germanium, indium, tin, platinum, palladium, zinc, aluminum oxide, silver oxide, gold oxide, copper oxide, titanium oxide, chromium oxide, nickel oxide, germanium oxide, indium oxide, tin oxide, platinum oxide, palladium oxide, zinc oxide, aluminum nitride, silver nitride, gold nitride, copper nitride, titanium nitride, chromium nitride, nickel nitride, germanium nitride, indium nitride, tin nitride, platinum nitride, palladium nitride, zinc nitride, aluminum fluoride, silver fluoride, gold fluoride, copper fluoride, titanium fluoride, chromium fluoride, nickel fluoride, germanium fluoride, indium fluoride, tin fluoride, platinum fluoride, palladium fluoride, or zinc fluoride. When the grating are fabricated on the second surface (as shown) or on the first surface, some amount of optical power may leak out of the waveguide (e.g., downward) due to symmetric first order diffraction. To minimize or suppress such leakage and maximize the coupling efficiency, a reflective layer (e.g., metal layer or a high reflection coating layer) may be deposited on the second surface. The metal can be aluminum, silver, gold, copper, or another high reflection metal.

Figure 13:
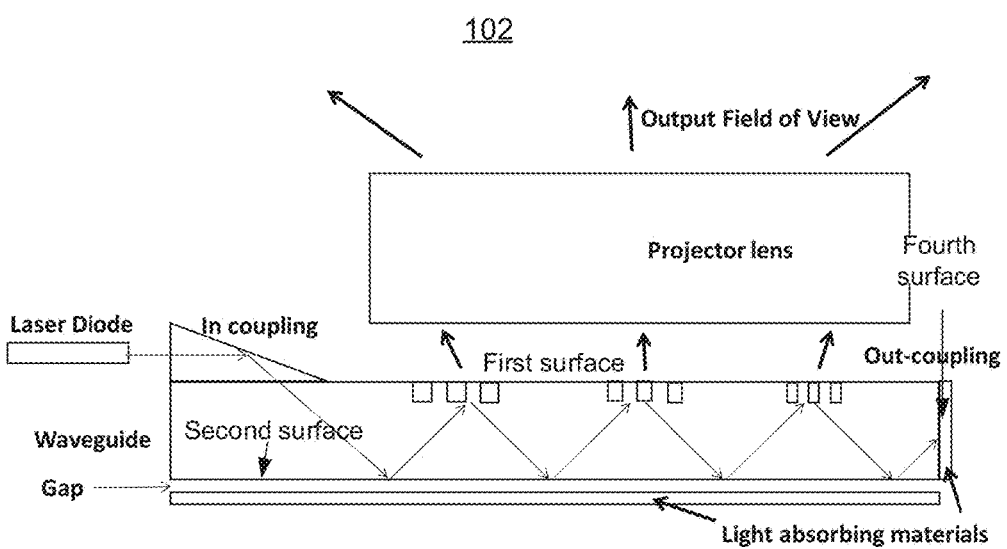
FIG. 13 is a graphical illustration of an exemplary light projecting system for projecting light, in accordance with various embodiments of the present disclosure.

FIG. 13 is a graphical illustration of an exemplary light projecting system 102 for projecting light, in accordance with various embodiments of the present disclosure. The light projecting system 102 may implement the in-coupling mechanism described above with reference to FIG. 4H and the out-coupling mechanism described above with reference to FIG. 3.

In some embodiments, light-absorbing material layers as shown can be used to minimize the background noise caused by leakage light from higher grating modes or by residue light from incomplete coupling. To minimize emitting the residue light from the waveguide, a light-absorbing material layer may be disposed on the sidewall of the waveguide directly (at the end of the light propagation in the waveguide). To reduce the leakage light from other grating modes, a light-absorbing material layer may be disposed with a gap from the second surface, to prevent from breaking the total internal reflection condition. The light-absorbing material layer can be a (colored) anodized aluminum layer, a rough surface, a black carbon paint layer, or another light-absorbing material layer.

That is, the light projecting structure may further comprise a fourth surface, a first light-absorbing material layer, and a second light-absorbing material layer. A remainder of the in-coupled light beam undergoing the total internal reflection reaches the fourth surface after the out-coupling at each of the grating structures. The fourth surface comprises the light-absorbing material layer for absorbing the remainder of the in-coupled light beam. The second light-absorbing material layer is parallel to the second surface and is separated by a gap from the second surface. The second light-absorbing material layer may absorb light that leaks out of the waveguide from the second surface. The gap may prevent absorbing in-coupled light still travelling inside the waveguide.

Figure 14:
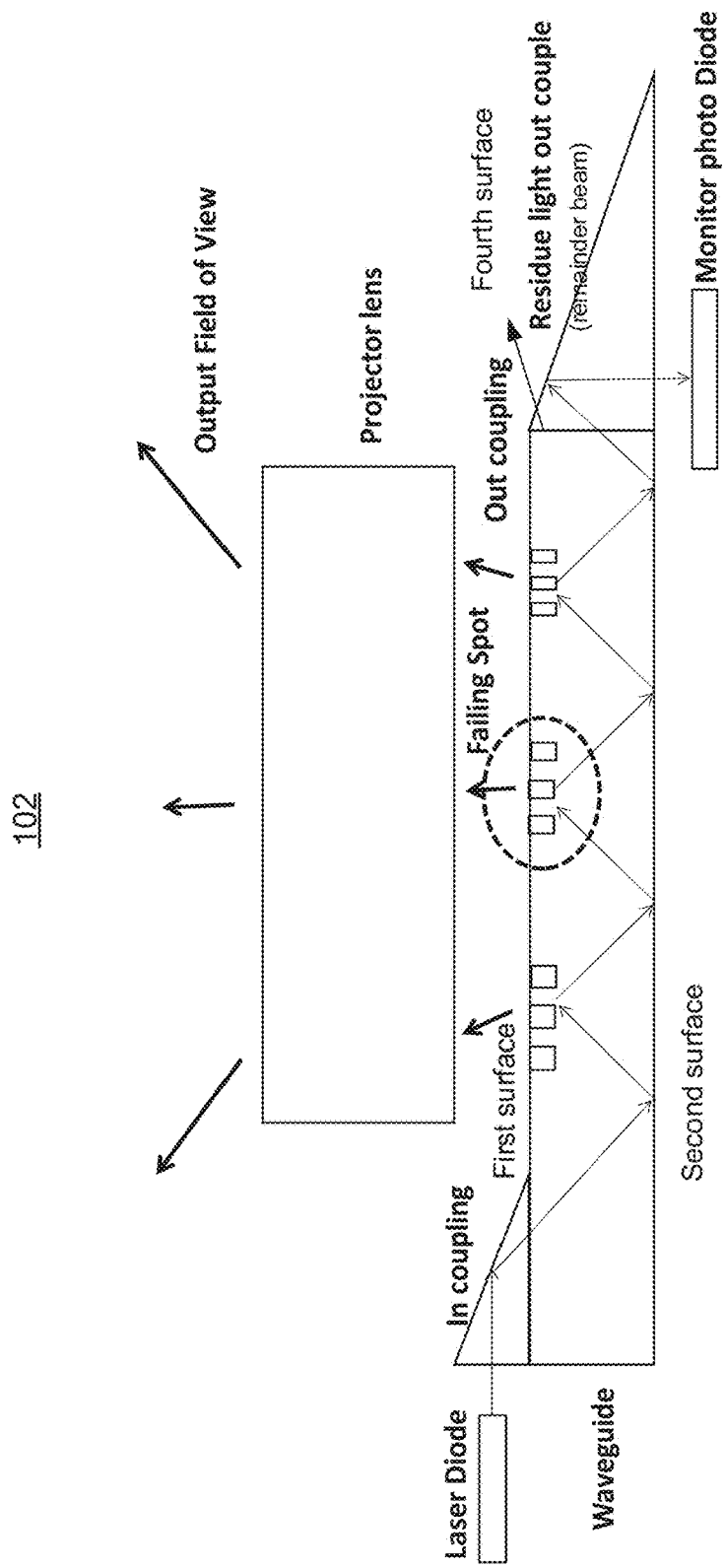
FIG. 14 is a graphical illustration of an exemplary light projecting system for projecting light, in accordance with various embodiments of the present disclosure.

FIG. 14 is a graphical illustration of an exemplary light projecting system 102 for projecting light, in accordance with various embodiments of the present disclosure. The light projecting system 102 may implement the in-coupling mechanism described above with reference to FIG. 4H and the out-coupling mechanism described above with reference to FIG. 3.

In some embodiments, as shown, a residue light out-coupling setup may be added to couple the residue light out of the waveguide (at the end of the light propagation in the waveguide), for example, via end coupling, grating coupling, or prism coupling described above. A detector such as a monitoring photo diode (e.g., silicon, germanium, or another diode) may be used to detect the out-coupled residue light. In one example, if any accident (e.g., chip cracking, water damage, vapor damage, laser dislocation, in-coupling prism dislocation, or another failure event) happens, the total internal reflection condition will be broken at the failing spot (an example of which is shown and labeled in the figure), which will result in change of the residue light. With a thresholding algorithm, the event of residue light changing can be timely detected by the monitoring photo diode, and the input laser can be shut off accordingly to ensure eye safety. If the input laser is not shut off, some of the laser beams may escape from the light projecting system with an uncontrolled power that may cause eye damage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A waveguide, comprising: a first surface and a second surface, wherein:
   the first surface comprises a plurality of grating structures;
   the waveguide is configured to guide an in-coupled light beam to undergo total internal reflection between the first surface and the second surface;
   the grating structures are configured to disrupt the total internal reflection to cause at least a portion of the in-coupled light beam to couple out of the waveguide from the first surface, the portion of the in-coupled light beam coupled out of the waveguide forming out-coupled light beams;
   the first surface is in an x-y plane comprising an x-direction and a y-direction perpendicular to each other;
   the in-coupled light beam propagates inside the waveguide substantially along the x-direction of the x-y plane;
   the out-coupled light beams propagate substantially along a z-direction normal to the x-y plane;
   the grating structure is each associated with a grating depth, a duty cycle, a period, and an orientation in the x-y plane with respect to the z-direction;
   the grating structures at different x-direction positions have at least one of different grating depths or different grating duty cycles;
   the grating structures at different x-direction positions have different periods; and
   the grating structures at different y-direction positions have different orientations.

2. The waveguide of claim 1, wherein:
   each of the grating structures is associated with an out-coupling efficiency; and
   the grating depth of the grating structure increases monotonically in the x-direction causing the out-coupling efficiency to increase monotonically along the x-direction.

3. The waveguide of claim 1, wherein:
   each of the grating structures is associated with an out-coupling efficiency; and
   the duty cycle of the grating structure increases monotonically in the x-direction causing the out-coupling efficiency to increase monotonically along the x-direction.

4. The waveguide of claim 1, wherein:
   each of the grating structures is associated with an out-coupling efficiency; and
   at least one of the grating depth or the duty cycle of the grating structure varies in the x-direction to cause the out-coupling efficiency to increase monotonically along the x-direction.

5. The waveguide of claim 1, wherein:
   the x-y plane comprises a plurality of regions corresponding to various ranges of positions along the x-direction, the regions comprising a first region and a second region;
   the first region is the closest to an area of the in-coupled light beam coupling into the waveguide;
   the second region is the furthest from the area of the in-coupled light beam coupling into the waveguide;
   the grating structures in the same region have similar out-coupling efficiencies; and
   a power of the out-coupled light beam from each of the grating structures in the first region is similar to a power of the out-coupled light beam from each of the grating structures in the second region.

6. The waveguide of claim 1, wherein:
   the period decreases monotonically in the x-direction to cause the out-coupled light beams to converge from the first surface in an x-z plane.

7. The waveguide of claim 1, wherein:
   the period increases monotonically in the x-direction to cause the out-coupled light beams to diverge from the first surface in an x-z plane.

8. The waveguide of claim 1, wherein:
   the grating structures along the y-direction have orientations rotating in a counter-clockwise direction to cause the out-coupled light beams to diverge from the first surface in a y-z plane.

9. The waveguide of claim 1, wherein:
   the grating structures along the y-direction have orientations rotating in a clockwise direction to cause the out-coupled light beams to converge from the first surface in a y-z plane.

10. The waveguide of claim 1, wherein:
   the period decreases monotonically in the x-direction and the grating structures along the y-direction have orientations rotating in a clockwise direction to cause the out-coupled light beams to converge from the first surface.

11. The waveguide of claim 1, wherein:
   the out-coupled light beams form an upright cone converging from the first surface.

12. The waveguide of claim 1, wherein:
   the period increases monotonically in the x-direction and the grating structures along the y-direction have orientations rotating in a counter-clockwise direction to cause the out-coupled light beams to diverge from the first surface.

13. The waveguide of claim 1, wherein:
   the out-coupled light beams form an inverted cone diverging from the first surface.

14. A light projecting system, comprising:
   a waveguide comprising a first surface and a second surface, the first surface comprising a plurality of grating structures; and a light source coupling light into the waveguide to form an in-coupled light beam, wherein:
  the waveguide is configured to guide the in-coupled light beam to undergo total internal reflection between the first surface and the second surface;
  the grating structures are configured to disrupt the total internal reflection to cause at least a portion of the in-coupled light beam to couple out of the waveguide, the portion of the in-coupled light beam coupled out of the waveguide forming out-coupled light beams;
  the first surface is in an x-y plane comprising an x-direction and a y-direction perpendicular to each other;
  the in-coupled light beam propagates inside the waveguide substantially along the x-direction of the x-y plane;
  the out-coupled light beams propagate substantially along a z-direction normal to the x-y plane;
  the grating structure is each associated with a grating depth, a duty cycle, a period, and an orientation in the x-y plane with respect to the z-direction;
  the grating structures at different x-direction positions have at least one of different grating depths or different grating duty cycles;
  the grating structures at different x-direction positions have different periods; and
  the grating structures at different y-direction positions have different orientations.

15. The light projecting system of claim 14, wherein:
each of the grating structures is associated with an out-coupling efficiency; and
at least one of the grating depth or the duty cycle of the grating structure varies in the x-direction to cause the out-coupling efficiency to increase monotonically along the x-direction.

16. The light projecting system of claim 14, wherein:
the period decreases monotonically in the x-direction to cause the out-coupled light beams to converge from the first surface in an x-z plane.

17. The light projecting system of claim 14, wherein:
the period increases monotonically in the x-direction to cause the out-coupled light beams to diverge from the first surface in an x-z plane.

18. The light projecting system of claim 14, wherein:
the grating structures along the y-direction have orientations rotating in a counter-clockwise direction to cause the out-coupled light beams to diverge from the first surface in a y-z plane.

19. The light projecting system of claim 14, wherein:
the grating structures along the y-direction have orientations rotating in a clockwise direction to cause the out-coupled light beams to converge from the first surface in a y-z plane.

20. The light projecting system of claim 14, wherein:
the period decreases monotonically in the x-direction and the grating structures along the y-direction have orientations rotating in a clockwise direction to cause the out-coupled light beams to converge from the first surface.

21. The light projecting system of claim 14, wherein:
the period increases monotonically in the x-direction and the grating structures along the y-direction have orientations rotating in a counter-clockwise direction to cause the out-coupled light beams to diverge from the first surface.

22. The light projecting system of claim 14, further comprising:
  a detector configured to receive reflections of the out-coupled beams off multiple locations on a distant object to determine distances of the multiple locations relative to the light projecting system; and
  one or more lenses disposed above the first surface, wherein the one or more lenses are configured to receive and collimate the out-coupled beams and project the out-coupled beams into an environment containing the distant object.

23. A waveguide, comprising: a first surface and a second surface, wherein:
  the second surface comprises a plurality of grating structures;
  the waveguide is configured to guide an in-coupled light beam to undergo total internal reflection between the first surface and the second surface;
  the grating structures are configured to disrupt the total internal reflection to cause at least a portion of the in-coupled light beam to couple out of the waveguide from the first surface, the portion of the in-coupled light beam coupled out of the waveguide forming out-coupled light beams;
  the first surface is in an x-y plane comprising an x-direction and a y-direction perpendicular to each other;
  the in-coupled light beam propagates inside the waveguide substantially along the x-direction of the x-y plane;
  the out-coupled light beams propagate substantially along a z-direction normal to the x-y plane;
  the grating structure is each associated with a grating depth, a duty cycle, a period, and an orientation in the x-y plane with respect to the z-direction;
  the grating structures at different x-direction positions have at least one of different grating depths or different grating duty cycles;
  the grating structures at different x-direction positions have different periods; and
  the grating structures at different y-direction positions have different orientations.

24. The waveguide of claim 23, wherein:
each of the grating structures is associated with an out-coupling efficiency; and
at least one of the grating depth or the duty cycle of the grating structure varies in the x-direction to cause the out-coupling efficiency to increase monotonically along the x-direction.

25. The waveguide of claim 23, wherein:
the period decreases monotonically in the x-direction to cause the out-coupled light beams to converge from the first surface in an x-z plane.

26. The waveguide of claim 23, wherein:
the period increases monotonically in the x-direction to cause the out-coupled light beams to diverge from the first surface in an x-z plane.

27. The waveguide of claim 23, wherein:
the grating structures along the y-direction have orientations rotating in a counter-clockwise direction to cause the out-coupled light beams to diverge from the first surface in a y-z plane.

28. The waveguide of claim 23, wherein:
the grating structures along the y-direction have orientations rotating in a clockwise direction to cause the out-coupled light beams to converge from the first surface in a y-z plane.

29. The waveguide of claim 23, wherein:

the period decreases monotonically in the x-direction and the grating structures along the y-direction have orientations rotating in a clockwise direction to cause the out-coupled light beams to converge from the first surface.

30. The waveguide of claim 23, wherein:

the period increases monotonically in the x-direction and the grating structures along the y-direction have orientations rotating in a counter-clockwise direction to cause the out-coupled light beams to diverge from the first surface.

* * * * *